(12) United States Patent
Batten et al.

(10) Patent No.: US 11,040,672 B2
(45) Date of Patent: *Jun. 22, 2021

(54) DIGITAL LICENSE PLATE SYSTEM

(71) Applicant: ReviverMx, Inc., Foster City, CA (US)

(72) Inventors: Dean Batten, North Bend, WA (US);
Prashant Dubal, San Jose, CA (US);
Avi Kopelman, Sunnyvale, CA (US);
Neville Truman Boston, Shingle Springs, CA (US)

(73) Assignee: REVIVERMX, INC., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/864,160

(22) Filed: May 1, 2020

(65) Prior Publication Data
US 2020/0269776 A1 Aug. 27, 2020

Related U.S. Application Data

(63) Continuation of application No. 15/863,648, filed on Jan. 5, 2018, now Pat. No. 10,682,967.
(Continued)

(51) Int. Cl.
*B60Q 1/00* (2006.01)
*B60R 13/10* (2006.01)
(Continued)

(52) U.S. Cl.
CPC .............. *B60R 13/10* (2013.01); *B60Q 1/503* (2013.01); *B60Q 1/56* (2013.01); *G07B 15/06* (2013.01);
(Continued)

(58) Field of Classification Search
CPC .. G06F 21/31; G06F 2203/04808; G06F 8/61; G06F 8/65; G06F 3/0637; B60R 13/10; B60R 19/50; B60R 13/105; B60R 11/04; B60R 1/00; B60R 1/06; B60R 2011/0026; B60R 2300/8053; G01S 13/931; G01S 2013/9321; G01S 17/931; G02B 27/01; G02B 27/017; G06Q 30/0265; G06Q 30/0633; G06Q 30/0645; G06Q 50/26; G06Q 30/0641; G06Q 30/0254;
(Continued)

(56) References Cited

U.S. PATENT DOCUMENTS 4,435,732 A    3/1984 Hyatt
9,663,028 B2*  5/2017 Parkes ............... G08B 5/36
(Continued)

FOREIGN PATENT DOCUMENTS

CN        102289693 B     9/2013

*Primary Examiner* — Duc Q Dinh
(74) *Attorney, Agent, or Firm* — David R. Stevens; Stevens Law Group

(57) ABSTRACT

A digital license plate supporting both access and analysis of vehicle relevant information is disclosed. The digital license plate includes sensors that provide status data to a processor in the digital license plate. A power path control module can initiate power state changes and adjust power depending on system state as determined by at least one the multiple sensors. In some embodiments a temperature control module is connected to a temperature sensor and configured to modify heat relevant display parameters as critical temperatures are approached.

17 Claims, 21 Drawing Sheets

Related U.S. Application Data

(60) Provisional application No. 62/442,750, filed on Jan. 5, 2017, provisional application No. 62/442,755, filed on Jan. 5, 2017, provisional application No. 62/442,764, filed on Jan. 5, 2017, provisional application No. 62/442,777, filed on Jan. 5, 2017, provisional application No. 62/442,727, filed on Jan. 5, 2017, provisional application No. 62/547,426, filed on Aug. 18, 2017, provisional application No. 62/442,734, filed on Jan. 5, 2017, provisional application No. 62/442,757, filed on Jan. 5, 2017, provisional application No. 62/547,468, filed on Aug. 18, 2017, provisional application No. 62/547,477, filed on Aug. 18, 2017, provisional application No. 62/443,133, filed on Jan. 6, 2017.

(51) Int. Cl.
| | |
|---|---|
| *G07B 15/06* | (2011.01) |
| *G09G 3/36* | (2006.01) |
| *B60Q 1/56* | (2006.01) |
| *G09G 5/00* | (2006.01) |
| *G07C 5/00* | (2006.01) |
| *B60Q 1/50* | (2006.01) |
| *G06K 19/08* | (2006.01) |
| *G06Q 30/02* | (2012.01) |
| *G06K 19/06* | (2006.01) |

(52) U.S. Cl.
CPC .......... *G07B 15/063* (2013.01); *G07C 5/008* (2013.01); *G09G 3/36* (2013.01); *G09G 5/00* (2013.01); *G06K 19/06037* (2013.01); *G06K 19/08* (2013.01); *G06Q 30/0265* (2013.01); *G09G 2300/0473* (2013.01); *G09G 2320/041* (2013.01); *G09G 2320/06* (2013.01); *G09G 2330/021* (2013.01); *G09G 2360/144* (2013.01); *G09G 2380/10* (2013.01)

(58) Field of Classification Search
CPC ............ G06Q 30/0255; B60K 2370/15; B60K 2370/193; B60K 2370/52; B60W 50/14; B60W 2050/0067; B60W 2050/0071; B60W 30/02; B60W 2050/146; H04N 21/41422; H04N 21/472; H04N 13/351; H04N 13/366; H04N 13/368; H04N 5/23241; H04N 5/232411; G08G 1/0112; G08G 1/096725; G08G 1/096741; G08G 1/096775; G08G 1/096791; G08G 1/0137; G08G 1/017; G08G 1/09; G08G 1/143; G08G 1/164; G08G 1/166; G08G 1/01; G08G 1/0968; G08G 1/096805; G08G 1/0175; G08G 1/096716; G08G 1/09675; G08G 1/096783; G08G 1/163; G08G 1/054; G08G 1/095
USPC ....... 345/102; 340/471, 426.25, 426.29, 433, 340/434, 905
See application file for complete search history.

(56) References Cited

U.S. PATENT DOCUMENTS

| | | | |
|---|---|---|---|
| 2006/0232531 A1 | 10/2006 | Amundson | |
| 2011/0295697 A1* | 12/2011 | Boston | B60R 13/10 705/14.68 |
| 2013/0006775 A1* | 1/2013 | Jordan | G08G 1/20 705/14.62 |
| 2016/0039364 A1* | 2/2016 | Findlay | G01S 19/14 340/468 |

\* cited by examiner

601

| State | CPU | Modem | Screen Info | Front Light | GPS | OBD-II |
|---|---|---|---|---|---|---|
| 602 | On | Connected | Changeable | On | On | On |
| 604 | Off | Off | Frozen on last image | Off | Off | Off |
| 606 | On, but low power | Connected | Changeable | On | Off | Off |
| 608 | Suspended/ low power | Low power/listening for SMS | Frozen on last image | Off | Off | Off |

Fig. 6B

DIGITAL LICENSE PLATE SYSTEM

RELATED APPLICATIONS

This application is a continuation of U.S. application Ser. No. 15/863,648 filed Jan. 5, 2018, and entitled DIGITAL LICENSE PLATE SYSTEM, which claims the benefit to the following U.S. Provisional Applications:
Ser. No. 62/442,750, filed Jan. 5, 2017,
Ser. No. 62/442,755, filed Jan. 5, 2017,
Ser. No. 62/442,764, filed Jan. 5, 2017,
Ser. No. 62/442,777, filed Jan. 5, 2017,
Ser. No. 62/442,727, filed Jan. 5, 2017,
Ser. No. 62/547,426, filed Aug. 18, 2017,
Ser. No. 62/442,734, filed Jan. 5, 2017,
Ser. No. 62/442,757, filed Jan. 5, 2017,
Ser. No. 62/547,468, filed Aug. 18, 2017,
Ser. No. 62/547,477, filed Aug. 18, 2017, and
Ser. No. 62/443,133, filed Jan. 6, 2017.

The applications are incorporated herein by reference for all purposes.

TECHNICAL FIELD

The present disclosure relates to vehicle mounted exterior displays, and more specifically to digital license plates supporting both access and analysis of vehicle relevant information.

BACKGROUND AND SUMMARY

Upon registering a vehicle, the owner of a vehicle is typically issued a license plate that displays the vehicle identification and registration information. The owner of the vehicle, law enforcement, or any other suitable party may use the displayed vehicle information to identify the vehicle. Such printed or stamped displays typically require regular updating. For example, in the State of California, the registration number (or license number) of the vehicle is formed into the license plate while registration dates and years are displayed using stickers. Each year, when the registration of the vehicle is renewed, a new sticker is mailed or provided to the owner of the vehicle to replace the older sticker, which may serve as an inconvenience to the owner of the vehicle. Additionally, because of the replaceable nature of the stickers, stickers are removable from the license plate, which may allow for stickers to be stolen or to detach pre-maturely, which leads to the loss of relatively important information regarding the vehicle.

Instead of static license plates, a dynamic display that presents vehicle identification and registration information can be arranged on the exterior of a vehicle. For example, U.S. Pat. No. 9,007,193, assigned to ReviverMX, describes a digital license plate with a dynamic display that improves updateability of vehicle identification and registration information. In one described embodiment, additional information not related to vehicle identification can also be displayed, including advertising or personal messages.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIG. 6B presents a table showing how power states affect system components.

DETAILED DESCRIPTION

Figure 1:
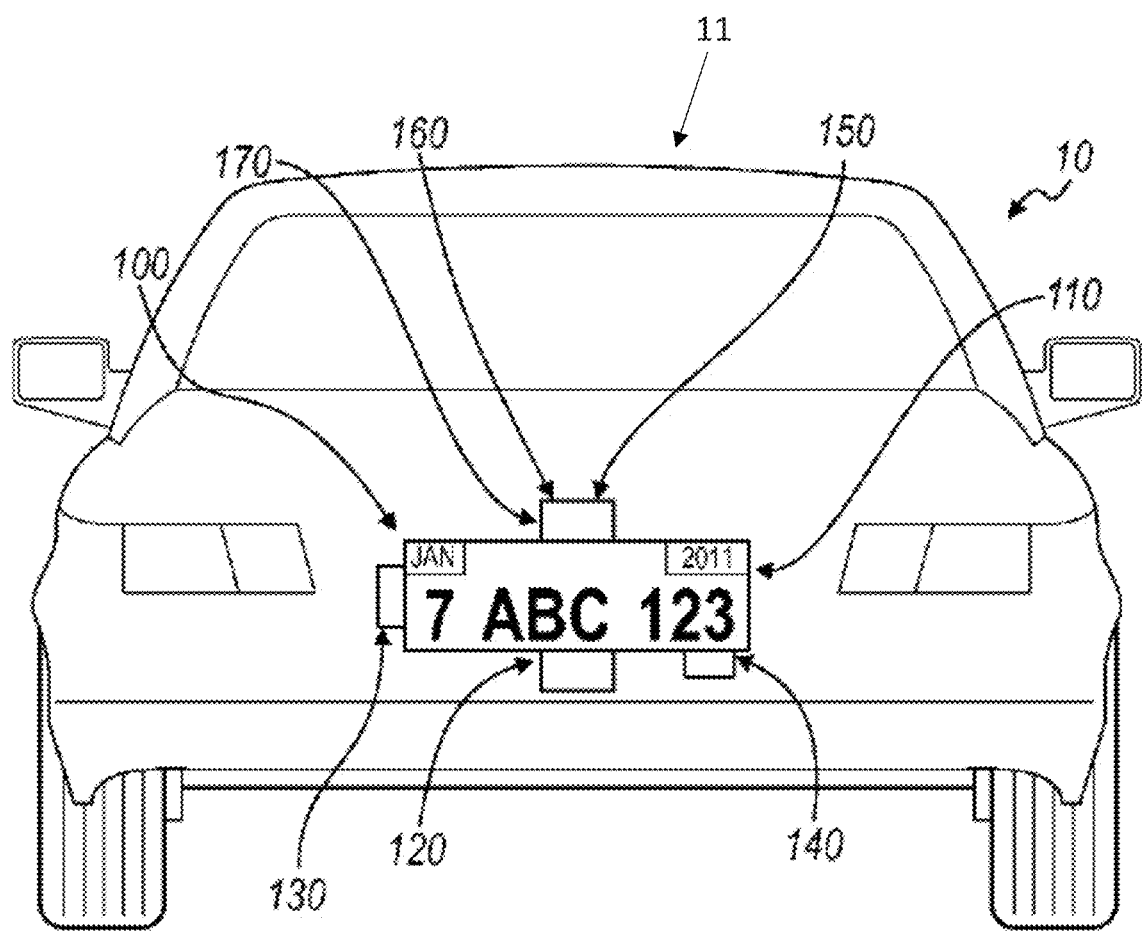
FIG. 1 illustrates one embodiment of a digital license plate system.

FIG. 1 illustrates one embodiment of a digital license plate system 11 supporting a dynamic display that presents vehicle identification and registration information and can be arranged on an exterior of a vehicle 10. The system 10 includes a display system 100 for use on the exterior of a vehicle 10 includes a display 110, a vehicle speed sensor 120, and a processor 130 coupled to the vehicle speed sensor 120. The processor 130 is configured to implement one of three operational modes of the display system 100 based on the speed and state of the vehicle 10: a first operational mode, wherein a first content, including identification information of the vehicle 10 and/or registration information of the vehicle 10 is rendered on the display 110 at a first power consumption level; a second operational mode, wherein a second content, including a message, identification information of the vehicle 10, and/or registration information of the vehicle 10, is rendered on the display 110; and a third operational mode, wherein content is rendered on the display 110 at a second power consumption level less than the first power consumption level. The display system 100 preferably also includes a communication device 140 that allows content (for example, updated identification information, registration information, and/or messages) to be transferred to and from the display system 100. The display system 100 may also include a location sensor 160, for example, a Global Positioning System (GPS) device, a cellular tower location triangulation device, or any other suitable location sensor that determines the location of the vehicle 10 on which the display 110 is arranged. The location sensor 160 may provide a substantially general location or a substantially exact location of the vehicle. Additionally, the display system 100 may include a storage device 150 that functions to store content; the processor 130 may retrieve content from the storage device 150 and render it on the display 110. The display system 100 may further comprise a sensor that determines the proximity of the vehicle 10 to a second vehicle.

The digital license plate system 11 is preferably used for registered vehicles such as personal cars, trucks, motorcycles, rental cars, corporately-owned cars, or any other suitable type of vehicle. The display system 100 functions to render identification and/or registration information of the vehicle 10 that is preferably provided by an official authority, such as a Department of Motor Vehicles (DMV). Preferably, the processor 120 renders the identification and/or registration information of the vehicle 10 on the display 110 such that a state vehicle code is followed, such as the size and dimension of the displayed area, the content, size, and lettering style of the information, and the visibility and reflectivity of the display 110. Preferably, the processor 120 renders content on the display 110 such that the state vehicle code of the state in which the vehicle 10 is registered is followed; alternatively, such as in the embodiment of the invention that incorporates a location sensor (such as a GPS device), the processor 120 may render content on the display 110 such that the state vehicle code of the state in which the vehicle is located is followed. The display system 100 preferably functions to display a message in addition to the vehicle identification and/or registration information. The message is preferably provided by an advertiser, for example, an advertiser that is substantially unrelated to the user. The subject matter of the advertisement provided by the advertiser may be substantially unrelated to the driver and/or owner of the vehicle 10, and the advertisement may be substantially unrelated to the vehicle 10. Alternatively, the advertisement may be related to a demographic to which the driver and/or owner of the vehicle 10 belongs or to any other suitable characteristic of the driver and/or owner of the vehicle 10. The advertisement may also be selectable by the driver and/or owner of the vehicle 10, for example, via the Internet on a personal computer, via the internet on an internet-capable mobile phone, or via any other suitable method. The advertisement may also be substantially related to the vehicle 10, for example, a display system mounted to a Porsche may display advertisements that are targeted at a demographic with a brand affinity toward Porsches. The advertisements may be substantially related to the location of the vehicle 10, for example, if the vehicle 10 is traveling within the vicinity of a venue, an advertisement for the venue may be shown. Alternatively, the message may be provided by a law enforcement agency, for example, an emergency broadcast regarding a missing person (for example, an Amber or an Elder alert). Furthermore, if the vehicle 10 is reported stolen, the message may indicate that the vehicle 10 is stolen, thus allowing parties external to the vehicle to identify the vehicle 10 as such.

Alternatively, the message may be any suitable type of message and may be controlled by any suitable party, for example, an official organization (for example, the DMV), the driver of the vehicle 10, the owner of the vehicle 10, a third party unrelated to the vehicle 10, or any other suitable party. In a first example, the message may include additional details related to the vehicle 10, including the model of the vehicle 10, the smog check results of the vehicle 10, maintenance issues of vehicle 10, or any other suitable type of information related to the vehicle 10. In a second example, the message may include details related to the driver of the vehicle 10, including organizations that the driver supports or belongs to (for example, the Girl Scouts, the San Francisco Giants baseball team, or a political party), a cause that the driver supports (for example, People for the Ethical Treatment of Animals (PETA) or cancer awareness), the demographic of the driver, or any other suitable type of information related to the driver. In this second example, the message may also include official details regarding the driver; for example, the message may indicate that the driver is a doctor or a law enforcement officer, allowing people outside the vehicle 10 to direct requests to the driver when his services are desired. Official details may also include details relating to the driving history of the driver; for example, if the driver has an imperfect driving record, a notification may be rendered on the display in order to warn others in the vicinity of the vehicle. In a third example, the message may include notifications for drivers in the vicinity of the vehicle 10, for example, traffic information or weather forecasts. In a fourth example, the message may include details regarding the owner of the vehicle. This may be particularly useful when the vehicle 10 is a member of a fleet of cars, for example, a car rental agency, a moving truck rental agency, a government fleet, or any other suitable type of fleet. The message of the fourth example may indicate which fleet the vehicle 10 belongs to; this information may be used to identify vehicles, to advertise regarding the fleet (for example, if the vehicle 10 belongs to a rental car agency, the message may include an advertisement or a message for that particular rental car agency), or for any other suitable purpose. However, the message may be of any other suitable type of message.

The display system 100 is preferably powered by a power source. The power source is preferably a power source of the vehicle 10, such as the accessories battery of the vehicle 10, the engine of the vehicle 10, or any other suitable power source of the vehicle 10. Alternatively, the display system 100 may include and be powered by a power source that is substantially independent from a power source of the vehicle 10. The power source of the display system 100 is preferably a battery, but may alternatively be a solar panel, wind generator, or any other suitable type of power source or combination of power sources. Yet alternatively, the display system 100 may include a power source that is rechargeable and coupled to a power source of the vehicle 10 that stores power from the vehicle 10 while the vehicle 10 is in operation and/or the ignition of the vehicle 10 is on. In this variation, the power source of the display system 100 allows for power generated while the vehicle is in operation to be used at a later time by the display system 100. However, the display system 100 may be powered using any other suitable method and/or arrangement.

The display 110 functions to display content, wherein content includes at least one of the identification information of the vehicle 10, registration information of the vehicle 10, and a message. The display 110 is operated by the processor 130 in one of the three operational modes. The display 110 is preferably of a substantially low power display, such as an LED display, an LCD display, an e-ink display, an organic LED display, an interferometric modulator display (iMoD), a display that uses electrophoretic deposition (EPD), a cholesteric liquid crystal display (ChLCDs), or any other suitable display. The display 110 may alternatively be a combination of the above display types. The display 110 preferably also has a substantially wide range of viewing angles. The display 110 is preferably also substantially thin, allowing the display 110 to replace existing license plates on the rear and/or front exterior of the vehicle. Similarly, the display 110 is preferably of a width, height, and/or aspect ratio that is/are substantially similar to existing license plates. Alternatively, the display 110 may be substantially different than existing license plates (for example, in the case of the relatively narrow height of European license plates, the display 110 may be of a substantially different height). However the display 110 may be of any other suitable dimension.

The display 110 may also include a backlight. The backlight functions to control the light intensity of the information displayed by the display 110. The backlight preferably includes a plurality of degrees of light intensity. The processor 130 may select the degree of light intensity based upon the mode of operation. The processor 130 may also select the degree of light intensity based upon ambient light levels proximal to the display 110. For example, the degree of light intensity may be higher during the day and lower during the night. In this variation, the display system 100 also includes a light sensor to detect the level of ambient light. The degree of light intensity of the display system 100 may also be selected based on the preferences of the driver, a law enforcement officer, or any other suitable party. However, the degree of light intensity of the display system 100 may be selected based on any other suitable criteria. The backlight may be a set of lights located substantially on the perimeter of the display 110 and that are directed toward the display 110. Alternatively, the backlight may be located substantially behind the display 110 and provide light from behind the display 110. However, the backlight may be of any other suitable arrangement. The backlight may be a series of low-power light sources, such as LEDs, but may alternatively be any other type of light source. Alternatively, the display may include a light-reflective surface that functions to illuminate the display 110 with reflected light. The light-reflective surface may be a mirror or any other suitable type of reflective material. The light-reflective surface may also be of a retroreflective material that reflects light back in the direction of the light source. The light-reflective surface may also be combined with a light source to more effectively illuminate the display 110, for example, the transflective materials used on freeway signs. However, any other suitable material or method may be used to illuminate the display.

The vehicle speed sensor 120 functions to detect the speed of the vehicle 10. The vehicle speed sensor 120 is preferably a sensor that measures the actual velocity and/or acceleration of the vehicle 10, such as an accelerometer coupled to the vehicle 10 or a tachometer coupled to the drivetrain of the vehicle 10 and which measures the number of revolutions of a drivetrain component, such as a wheel, for a period of time in order to determine the speed of the vehicle 10. In a second variation, the vehicle speed sensor 120 couples to the speedometer of the vehicle 10 and/or an onboard computer of the vehicle 10; in this configuration, the speed sensor 120 functions to transmit information gathered by the speedometer and/or the onboard computer to the processor 130, rather than measure the vehicle speed directly. However, the vehicle speed sensor 120 may be any other suitable type of sensor that determines the actual speed and/or acceleration of the vehicle 10. Alternatively, the vehicle speed sensor 120 may be a sensor that measures the relative velocity and/or acceleration of the vehicle, for example an ultrasonic sensor or an infrared sensor that determines the speed of the vehicle relative to another object. The other object may be a stationary portion of the road or a nearby vehicle. However, the vehicle speed sensor 120 may determine the speed of the vehicle 10 using any other suitable method or sensor type.

The processor 130 functions to render content on the display 110 based upon the operational mode of the display system 100: a first mode, wherein a first content is rendered on the display 110 at a first power consumption level, the first content including identification information of the vehicle 10 and/or registration information of the vehicle 10; a second mode, wherein a second content is rendered on the display 110, the second content including a message and possibly including identification information of the vehicle 10 and/or registration information of the vehicle 10; and a third mode, wherein content is rendered on the display 110 at a second power consumption level that is less than the first power consumption level. Preferably, content rendered in the third operational mode includes the identification and registration information of the vehicle 10. In a variation of the display system 100, content rendered in the third operational mode includes a message in addition to the identification and/or registration information of the vehicle 10. However, content rendered on the display 110 in the third operational mode may include any other information or messages or any combination thereof.

The processor 130 is preferably coupled to the vehicle speed sensor 120. As mentioned above, the speed determined by the vehicle speed sensor 120 may be the actual speed of the vehicle 10 or may alternatively be the speed of the vehicle 10 relative to another object (for example, a neighboring vehicle). The processor 130 preferably selects the operational mode of the display system 100 based on the speed and power state of the vehicle 10. However, a device other than the processor, such as the onboard computer of the vehicle 10, a law enforcement officer, a second processor connected to a remote server, or any other suitable device or institution may select the operational mode of the display system 100. The processor 130 preferably operates the display 110 in the first and second operational modes when the vehicle 10 is on, and the processor preferably operates the display 110 in the third operational mode when the vehicle 10 is off. The vehicle 10 is preferably considered "on" when the driver turns any portion of the vehicle 10 on. In many cars, there is a plurality of "on" states, for example, a first "on" state in which basic functionality, such as opening and closing windows, is allowed; a second "on" state in which more advanced and/or higher-power functionality, such as ventilation systems or the sound system, is allowed; and a third "on" state in which the vehicle may be driven (or, in other words, the ignition is on). The vehicle 10 may be considered "off" otherwise. In the "off" state, certain portions of the vehicle may still be "on", for example, security sensors, key proximity sensors (such as keyless entry), or any other type of substantially-low-power functionality. Alternatively, the vehicle 10 may be considered "on" when the ignition is on and considered "off" when the ignition is off, regardless of any other functionality that the vehicle may provide to the driver. Yet alternatively, the vehicle 10 may be considered "on" when the presence of a person is detected within the vehicle and "off" when there is no one within the vehicle. The vehicle 10 may also be considered off when the emergency brake or transmission parking brake of the vehicle 10 is engaged, regardless of the state of the ignition or presence of a person within the vehicle 10. However, the vehicle may be considered "on" and "off" using any other suitable criteria. The processor 130 preferably operates the display 110 in the first operational mode when the vehicle 10 is at a first speed and preferably operates the display 110 in the second operational mode when the vehicle 10 is at a second speed lower than the first speed. The second speed is preferably substantially zero speed, or substantially close to zero speed. This allows for identification and/or registration information of the vehicle 10 to be substantially visible while the vehicle 10 is in motion (the first speed), as shown in FIG. 1. This allows any party external to the vehicle 10 to visually access the information rendered on the display 110 in a manner similar to that used to visually access information on a static (or stamped) license plate. In one variation, the processor 130 operates the display 110 in the second operational mode and renders the second content on the display 110 when the vehicle 10 is on and at the second speed, wherein the second speed is preferably zero speed or a substantially slow speed, such as when the vehicle is moving slowly through heavy traffic. Because the message depicted in the second mode takes up a portion of the display area of the display, the identification and/or registration information also depicted may consume a smaller portion of the display area in the second operational mode as compared to the first operational mode. Because the identification and registration information is depicted in a is smaller size on the display 110 when a message is displayed concurrently with the vehicle 10 information, the visibility of the identification and registration information may be less in the second operational mode than in the first operational mode. Alternatively, the identification and/or registration information rendered on the display 110 in the second operational mode may be of the same or similar format (for example, size and layout) as in the first mode, but the message may be rendered on the display to overlap the identification and/or registration information. This may also result in reduced visibility of the identification and/or registration information of the vehicle 10. Therefore, the message may be displayed only under such conditions as when the vehicle is stopped or nearly stopped so that decreased visibility of the identification and/or registration information does not occur when the vehicle 10 is moving at a substantial speed; however, the additional functionality of displaying the message when the vehicle is at the second speed still remains. Additionally, the message may provide an undesired distraction for a party outside of the vehicle 10 while the vehicle 10 is in motion, and thus, by only displaying the message while the vehicle is stopped or nearly stopped, the possibility of distraction may be substantially reduced. However, the processor 130 may alternatively operate the display 110 in the first and second operational modes at any other suitable speed arrangement. In a variation of this, the display system 100 may enhance legibility of the information for a party outside of the vehicle 10 by horizontally mirroring content rendered on the display 110 when the display 110 is mounted on the front exterior of the vehicle 10; in this variation, content rendered on the display may be read in the correct orientation by a party viewing the display 110 in a rearview or side mirror of a second vehicle located ahead of the vehicle 10. However, the processor may render content on the display 110 by any other means or arrangement such that distraction caused by the display 110 is reduced and legibility of the displayed content is improved.

As described above, the processor 130 preferably functions to operate the display 110 in the third operational mode when the vehicle 10 is off. The third operational mode preferably displays identification and registration information of the vehicle 10 at a second lower power consumption level that is less than the first power consumption level. In a variation of this, a message is rendered on the display 110 in addition to the identification and registration information of the vehicle 10, although any one or combination of a message, identification information of the vehicle 10, registration information of vehicle 10, or any other information may be rendered on the display 110 when in the third operational mode. When the vehicle 10 is off, the power available to the display system 100 may be less than when the vehicle is on. For example, in the variation wherein the display system 100 obtains power from a power source of the vehicle 10, the display system 100 may be utilizing energy that was stored from another period of time when the vehicle was on. Thus, there is a limited supply of power, and by operating the display 110 at a lower power consumption level in the third operational mode than in the first and/or second operational modes while the vehicle is off, the length of time that content may be rendered on the display 110 may be increased for a given amount of energy available to the display system 100.

The operation of the display 110 in the third operational mode may reduce the power consumption of the display system 100 in a variety of arrangements. In a first variation, the display 110 may be turned off at a first time and turned on at a second time. The display 110 may be timed to cycle on and off at specific time intervals, for example, every five minutes. The driver, the owner, or any other suitable party may adjust the intervals. This allows the display 110 to be turned off for a length of time and turned on for another length of time. The length of time that the display 110 is turned off is preferably substantially longer than the length of time that the display 110 is turned on, which substantially decreases the power consumption of the display 110. In a further variation, when in the third operational mode, content may be rendered on the display 110 in colors that require less power to display, as compared to when operating in the first operational mode. However, the processor may operate the display 110 by any other means that reduces power consumption of the display 110 when in the third operational mode, as compared to the first operational mode. Furthermore, the processor 130 may reduce the power consumption level of the processor 130 when in the third operational mode, for example, by reducing clock speed, shutting down auxiliary functions such as transmitting data to and/or receiving data from the communications device 140, or any other method to reduce power consumption of the processor 130. When the processor 130 operates the display in the third operational mode, the light intensity of the display 110 may be substantially identical to the light intensity of the first and/or the second operational modes. Alternatively, because the vehicle 10 is presumed to be stationary when off (a possible exception to this presumption would be when the vehicle 10 is being towed) and the party to which message and/or identification information and/or registration information is to be shown is substantially proximal to the vehicle 10, the light intensity of the display 110 may be substantially less in the third operational mode than in the first and/or second operational modes. However, any other suitable light intensity may be used in the third operational mode.

In a second variation, the display may be continuously on when operating in the third operational mode but at a substantially lower light intensity than in the first and/or second operational modes. In a first example, the backlight of the display 110 may be at the lowest light intensity in the third mode. In a second example, in the variation of the display 110 that is e-ink, the backlight of the display 110 may be turned off, allowing only the e-ink, which is bistable and does not require additional power to maintain, to be visible. The method and arrangement to decrease the power consumption of the display 110 in the third operational mode is preferably one of the two above variations, but may alternatively be a combination of the above variations or any other suitable method or arrangement.

The processor 130 may alternatively operate the display 110 in a fourth operational mode. The fourth mode may be determined by communication through the communication device 140. In a first example, the communication device 140 may communicate with a law enforcement agency and may indicate to the processor 130 that the vehicle 10 has been stolen. The processor 130 may then operate the display 110 in a fourth operational mode in which a notification that the vehicle 10 is a stolen vehicle is rendered on the display 110. However, the fourth mode may alternatively be of any other suitable type and actuated by any other suitable method.

The communication device 140 functions to allow content, information, and/or data to be transferred to and from the display system 100. The communication may be conducted with an official organization (such as a DMV office or a law enforcement agency), a content database, the driver of the vehicle, the owner of the vehicle, or any other suitable party. The communication device may transmit and/or receive information regarding vehicle identification and/or registration information, vehicle maintenance information, driver information, vehicle location information (for example, in the variation of the display system 100 that includes a GPS location device or accesses GPS location services), updated advertisements, or any other suitable type of information. The communication device 140 is preferably of a wireless communication type, for example, one that communicates with cellular phone towers, Wi-Fi hubs, or any other suitable type of wireless communication. However, the communication device 140 may be a wired communication device. In this variation, updated information is transferred when the display system 100 is "plugged in" to an updating device, for example, a computer at a maintenance facility, at a DMV office, or any other suitable location, or another vehicle and/or display system 100 that has wireless communication capabilities. The communication device 140 may also include a communication processor that functions to interpret communications to and/or from the display system 100. The communication processor is preferably separate from the processor 130, but may alternatively be the processor 130. The communication processor may function to encrypt and/or decrypt communications to and/or from the display system 100. The encryption/decryption may be any one of a variety of authentication and encryption schema. For example, cryptographic protocols such as Diffie-Hellman key exchange, Wireless Transport Layer Security (WTLS), or any other suitable type of protocol. The communication processor may also function to encrypt data to encryption standards such as the Data Encryption Standard (DES), Triple Data Encryption Standard (3-DES), or Advanced Encryption Standard (AES). However, the communication device 140 may allow any other suitable type of communication and may be of any other suitable arrangement.

The communication device 140 may receive content, information, and/or data from a content database. Preferably, the content database is arranged substantially remote from the processor 130. The content database also preferably contains content provided by an institution, for example, an advertiser, a school, a record company, or a sports team or venue; content provided by the institution preferably includes advertisements. Alternatively, the content database may contain content provided by the driver and/or owner of the vehicle 10, for example, a message composed by the owner of the vehicle 10 congratulating a child upon graduation from high school. However, any other suitable party may provide content to the content database, and the content database may include a combination of advertisements from one or more institutions and personal messages from one or more individuals. In a first example, content on the content database is accessed by the processor 130 via the communication device 140 and stored on the storage device 150. Preferably, the storage device 150 is arranged substantially proximal to the display 110, such as within the vehicle 10 or within a housing containing the display 110; however, the storage device 150 may be located remotely from the vehicle 10, such as on a hard drive connected to a remote server. In a second example, content on the content database is accessed via the communication device 140 in real time and then rendered on the display 110, thereby bypassing storage of content on the storage device 150. However, content from the remote message database may be accessed by any other means before being rendered on the display 110. In a third example, the storage device also functions as the content database, wherein content from at least one institution or individual, such as those listed above, may be stored on the storage device and also selected by the driver and/or owner of the of vehicle 10 to be rendered on the display 110. In this variation, the storage device 150 of the display system 100, also functioning as a content database, may be accessed by a second display system separate from the display system 100, such as a display system arranged on a second vehicle. However, any other suitable party may select the content to be rendered on the display 110 from the content database. Furthermore, content on the content database may be selected, accessed and/or modified by the driver and/or owner of the vehicle 10, or any other suitable party, via an interface. Preferably, the interface is internet-based and accessible via a web browser, for example, on a mobile smart phone or on a computer. In a first example, the driver and/or owner of the vehicle 10 may access interface with an internet-capable mobile phone, then log into the content database and select content (for example, a San Francisco Giants Baseball banner) he wishes to be rendered on the display 110. In a second example, the content database stores vehicle registration information, and upon the renewal of the registration of the vehicle 10, a DMV representative may access the content database via a computer equipped with the interface and then update the registration information of the vehicle 10 on the content database; the communication device 140 may then retrieve the updated registration information from the content database and the registration information subsequently rendered on the display 110 may reflect the renewal. Alternatively, the interface may be a handheld device that is hardwired, or physically "plugged in", to the display system 100. In this variation, the interface may or may not be removable from the display system 100. Furthermore, the interface may not couple to the content database via the communication device 140, but instead only provide the driver and/or owner of the vehicle 10, or any other suitable party, to access content already located on the display system 100, such as on the storage device 150 arranged substantially proximal to the display 110. For example, a law enforcement officer, upon pulling over the driver of the vehicle 10 for a traffic violation, may hook up to the display system 100 arranged on the vehicle 10 a device equipped with the interface, wherein the interface provides access to the current identification and/or registration information of the vehicle 10. However, the interface may permit access to any content contained in any other device coupled to the display system 110 and by any other means.

The communication device 140 may transmit data regarding the rendering of a particular content on the display 110. Preferably, an advertisement is included in the content rendered on the display 110, and the communication device 140 transmits data regarding the rendering of the advertisement on the display 110. This data may include, for example, how long the advertisement was displayed, when it was displayed, and where it was displayed. Alternatively, this data could be collected and/or stored by the processor 130, although it could be collected and stored by any other device or means. Preferably, this information is used to determine the magnitude or type of an award granted to the driver and/or owner of the vehicle 10. In a first example, if an advertisement for tickets to a baseball game featuring a given team is rendered on the display 110, the driver and/or owner of the vehicle 10 may receive a monetary award commensurate with the length of time that the advertisement was rendered on the display 110; alternatively, the owner and/or driver of the vehicle 10 may receive one or more tickets to a baseball game featuring this team in return for displaying the advertisement in an area with a relatively low attendance at baseball games. However, any other method may be used to grant an award of any other type to the driver and/or owner of the vehicle 10 in return for the rendering of content on the display 110.

The sensor for determining the proximity of the vehicle 10 to a second vehicle functions to indicate to the processor 120 to modify content rendered on the display 110. The processor 120 preferably renders a message, such as an advertisement, on the display 110 when the second vehicle is substantially proximal to the vehicle 10 (such as in the second mode); the processor 120 preferably renders the identification and registration information of the vehicle 10 on the display 110 when the sensor detects that no second vehicle is substantially proximal to the vehicle 10 (such as in the first mode or the third mode). The sensor may be a RADAR detector, a LIDAR detector, an IR transmitter-photoresistor pair, a camera, or any other suitable device configured to detect the proximity of the vehicle 10 to a second vehicle. In the embodiment of the sensor that is a camera, the camera may be configured to detect identification information of the second vehicle (such as the license plate number of the second vehicle); this information may be used to determine the owner of the second vehicle and obtain information relating to the owner of the second vehicle. The processor 120 may then modify content rendered on the display 110 based upon the demographic of the owner of the second vehicle, such as by displaying an advertisement for discount prescription medications if the owner of the second vehicle is determined to be at least sixty years of age; by displaying an advertisement for a women's fashion store if the owner of the second vehicle is determined to be female; or by displaying driver information if the second vehicle is determined to be owned by or used by a law enforcement agency. In this example, identification information of the second vehicle may be transmitted to a database of vehicle identification information, wherein the database returns information about the owner of the second vehicle 10, such as age, ethnicity, or gender; the database may be maintained by an entity such as a DMV or the American Automobile Association (AAA). Alternatively, the camera may be configured to determine directly the demographic of the driver of the second vehicle (for example, by matching the driver to a specific ethnicity by with facial recognition software) or the response of the driver of the second vehicle to a message rendered on the display 120. In the latter example, the response of the driver of the second vehicle may be used to pick an alternative message that may produce a more favorable response if the initial response is negative, or to choose a similar message if the first response is positive. Furthermore, in the embodiment in which the sensor is a camera, the camera may be used to measure the level of ambient light substantially proximal to the vehicle 10 such that content may be rendered on the display at an appropriate light level; for example, the brightness of the display may increase if the camera determines a high level of sunlight near the vehicle 10. However, the sensor may detect any other information relevant to the second vehicle and indicate to the processor 120 to modify content rendered on the display based upon any other variable.

Figure 2:
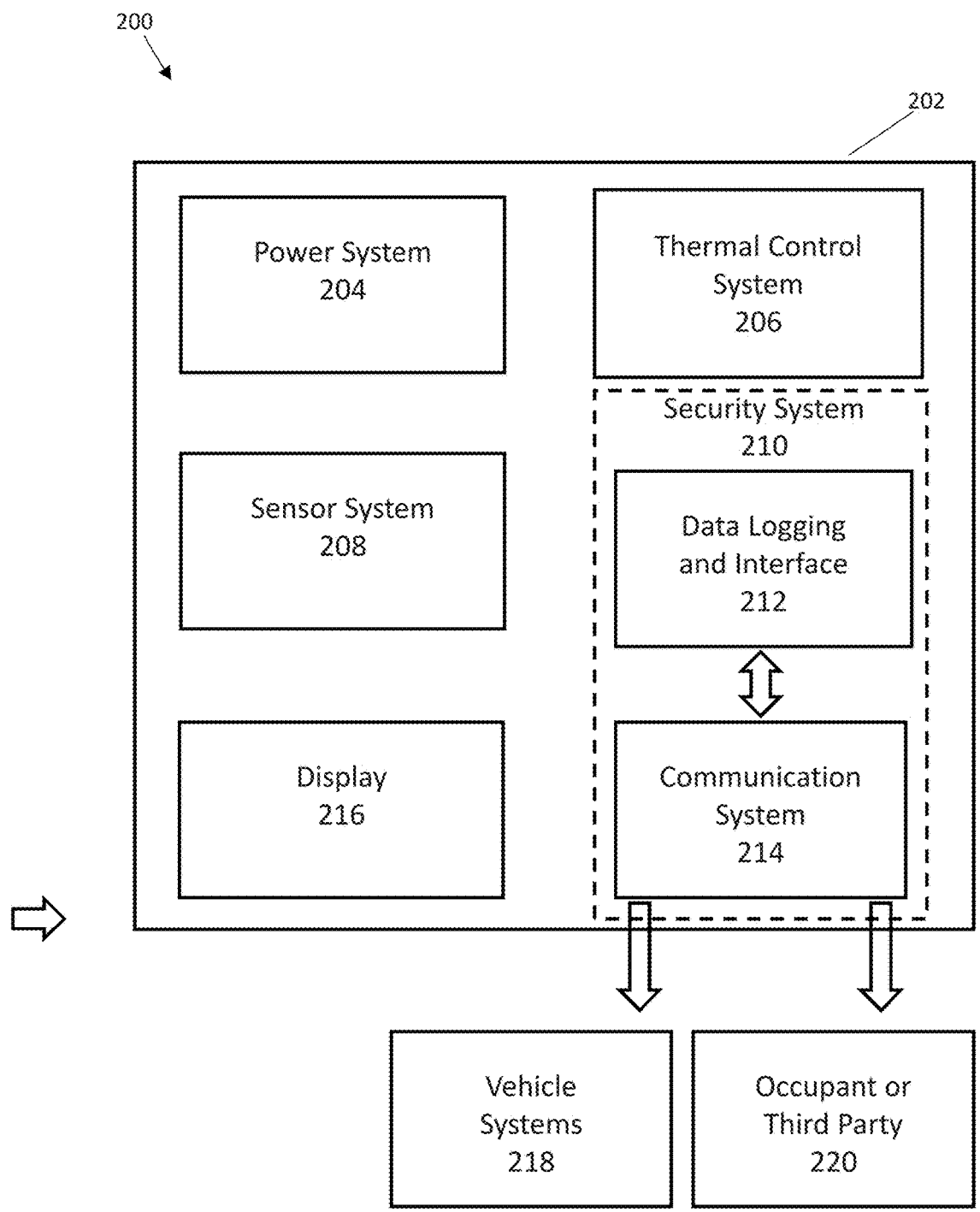
FIG. 2 illustrates various systems in a digital license plate system.

FIG. 2 illustrates various systems, sub-systems, or modules that can be incorporated into a digital license plate system 200, along potential interacting agents such as vehicle systems 218, vehicle occupants, or third party persons or automated systems 220. In this Figure, a digital license plate 202 can be mounted on a vehicle. Systems within the digital license plate can include, but are not limited to, a power system 204, thermal control system 206, and sensor system 208. An electronic security system 210 limits unauthorized access to data logged and distributed via a data logging and interface system 212, or any received/transmitted communications through communication system 214. Received data can be used to determine or update information presented by display 216.

Figure 3:
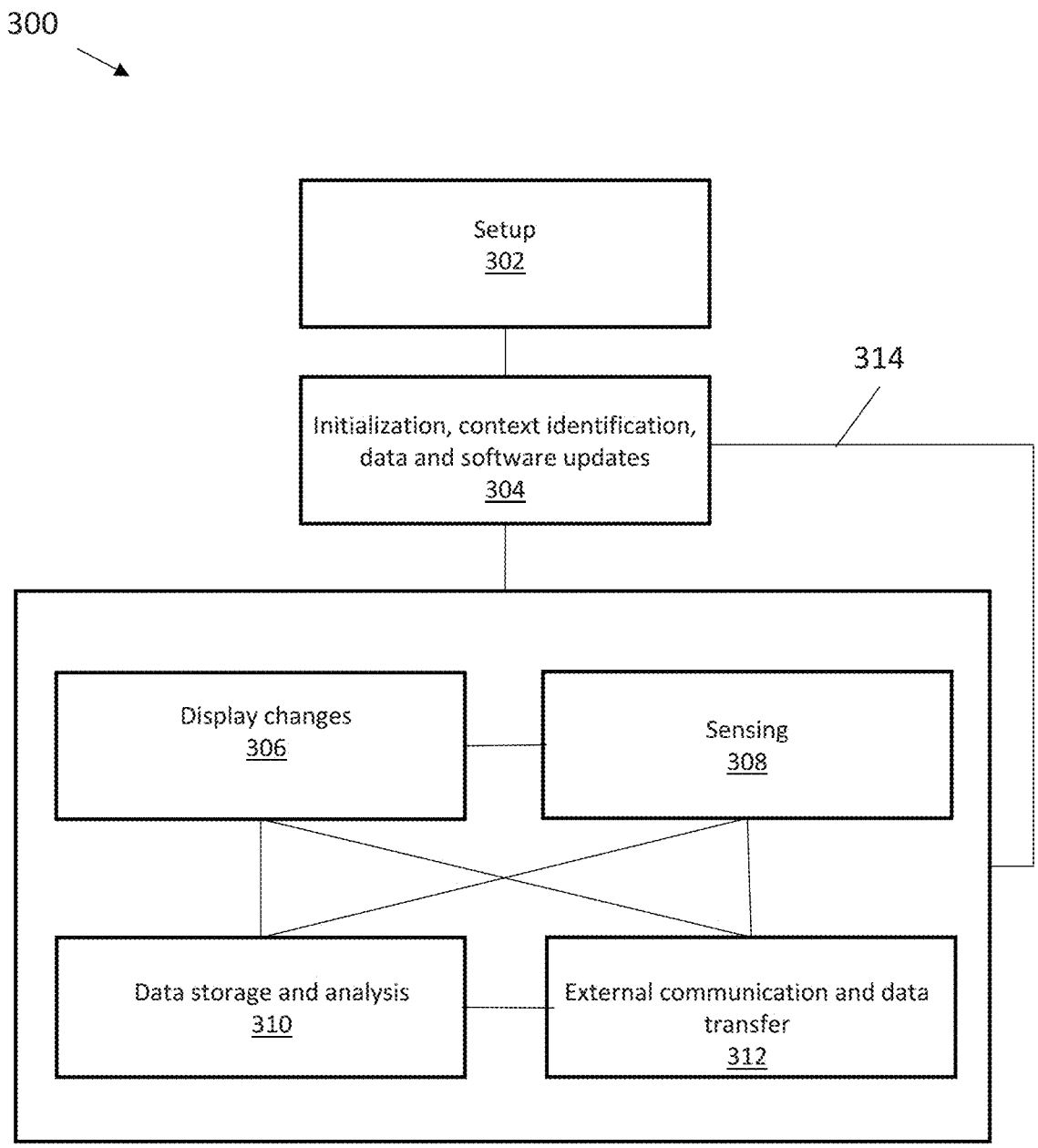
FIG. 3 illustrates operation of a digital license plate system.

FIG. 3 illustrates a method for operation of one embodiment of a digital license plate system. After an initial setup 302 to register and link a digital license plate to a specific vehicle, the digital license plate can be ready for initialization 304 on vehicle startup (or alternatively, on vehicle stop), and can use timers or sensors to help identify context, location, or display presets for the digital license plate. Data uploading/downloading can be initiated, and any firmware/software updates completed. In normal operation, changes 306 to the display can occur in response to sensed data 308, from data storage or analysis system 310, or as a result of external communication and data transfer 312. Similarly, sensed or stored data can be transmitted or received, and the sensors activated, deactivated, or sensor data analyzed based on internal triggers or externally received data. When a vehicle stops, or in response to a timing or other suitable trigger, data can be transferred (via line 314) back to the initialization step 304.

Figure 4A:
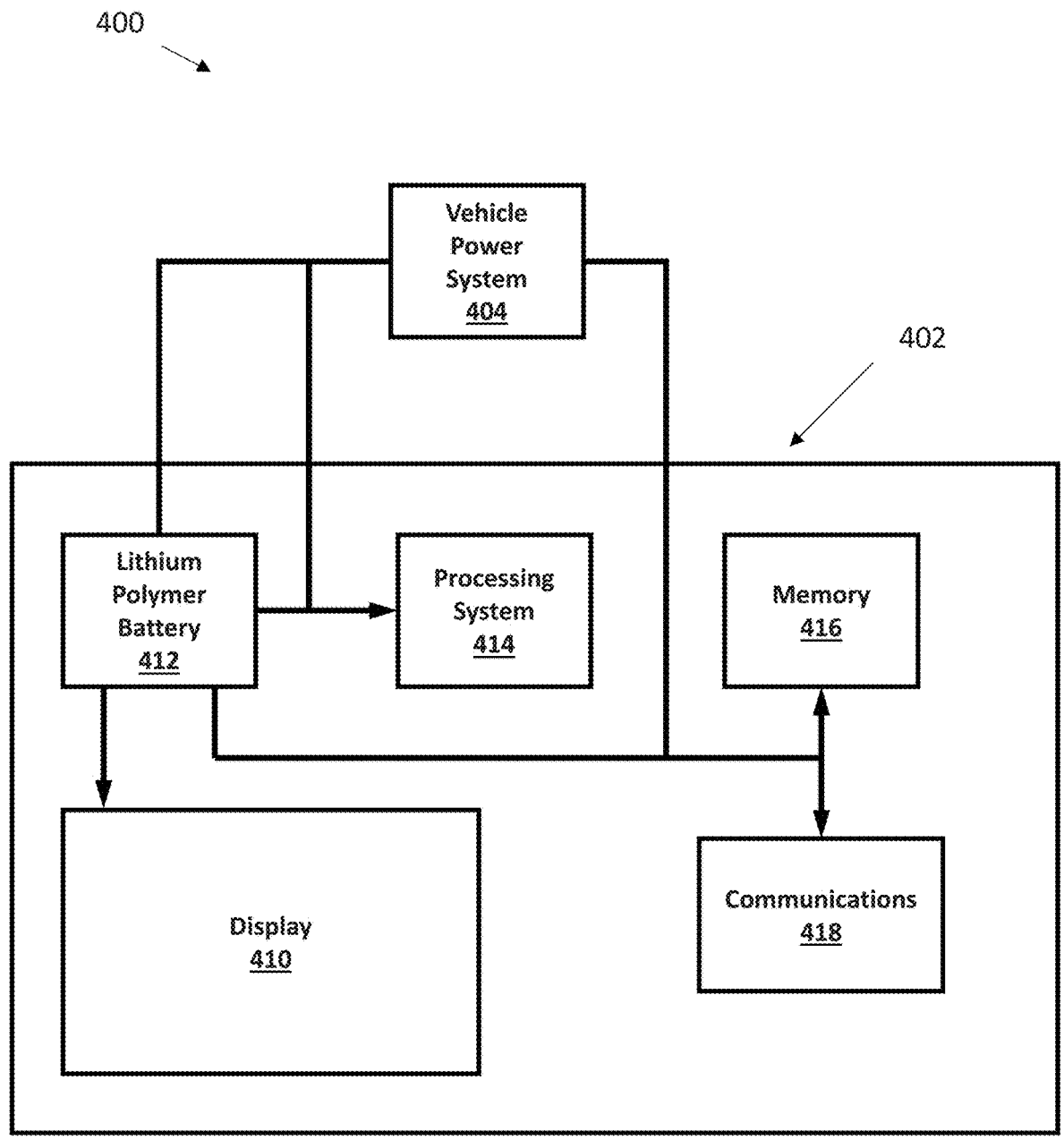
FIG. 4A is an embodiment of an on-module battery power system.
Figure 4B:
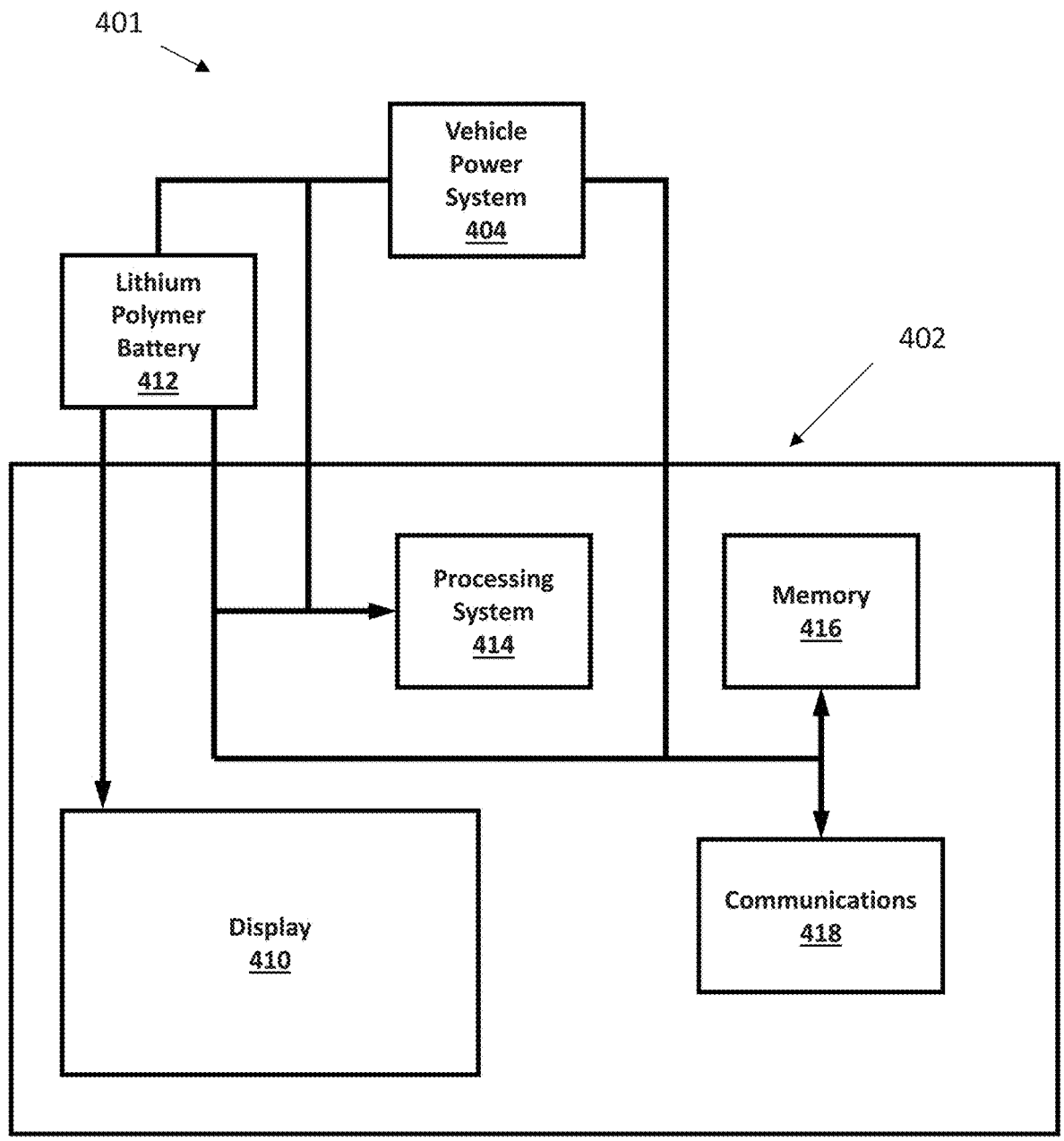
FIG. 4B is an embodiment of an off-module battery power system.

FIG. 4A depicts one embodiment of display system 400 showing selected components. Mounted within an externally attachable module 402 is a battery 412 to supply power to a processing system 414, a memory module 416, a communications module 418 and display 410. Power can also be supplied by a vehicle power system 404, either directly or via recharge of the battery 412. In some embodiments, battery 412 may be a lithium polymer, a nickel-cadmium, lead acid, Lithium Ion, Lithium Air, Lithium Iron Oxide, Nickel Metal Hydride, absorbent glass mat (AGM), or a valve-regulated lead-acid (VRLA) battery. FIG. 4B shows display system 401, an alternative to that depicted in FIG. 4A. In that embodiment, the battery 412 can be positioned within the vehicle, external to externally attachable module 402. Advantageously, this can allow use of larger batteries, or batteries of differing chemistries, including conventional rechargeable lead-acid batteries.

When a vehicle associated with display system 400 is powered on, the display system 400 is normally supplied with power from the vehicle systems. In some embodiments, the power supplied to display system 400 by vehicle systems may be of 12V. In other embodiments, other voltage values may be implemented. When the vehicle is powered off, display system 400 may still need to be powered on to display, for example, vehicle registration information. In some embodiments, display system 400 may need to be powered on substantially all the time. During the vehicle powered off state display system 400 draws power from battery 412.

Figure 5:
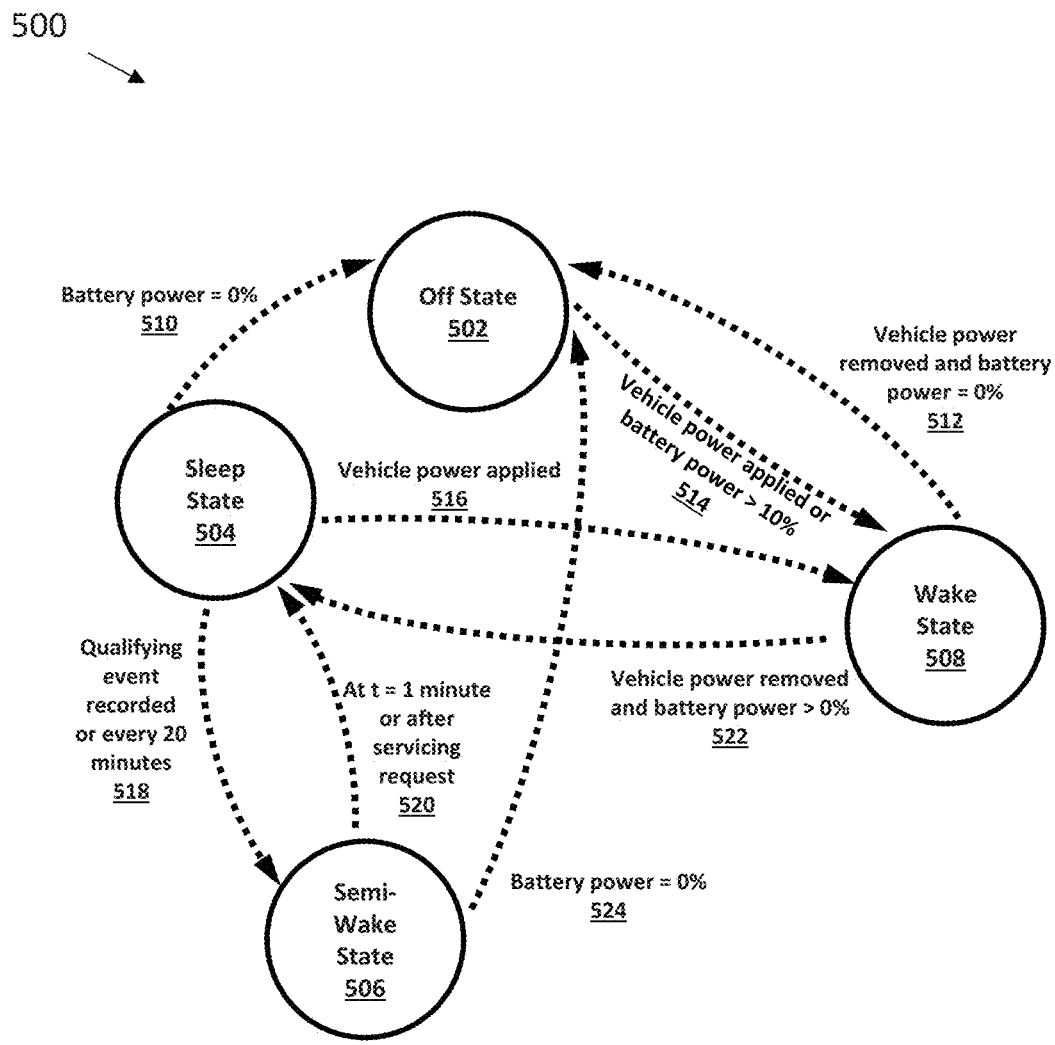
FIG. 5 is a state diagram for a power system.

As seen with respect to FIG. 5, position on a power state chart 500 for a display system 400 can depend on the availability and requirements of electrical power. Four states are described as associated with display system 100, including an:

Off state: Display system 400 is switched off, no processes are running

Sleep state: In this state, only a minimal number of processes are running, for example:
1. Real Time Clock
2. Capacitive Touch Monitoring
3. Accelerometer Monitoring In some embodiments, an infrared sensor may be used to detect motion around the digital display to trigger a wake state. In other embodiments, the processor may cause the plate to wake up at regular intervals.

Wake state: In this state, all device processes associated with display system 100 are running, including the processor, the communication module (including the cellular communication module, the Wi-Fi module, and the Bluetooth module), the digital display, the accelerometer, the gyroscope and the speed sensor.

Semi-wake state: In this state, all processes associated with the sleep state are running (as described above) and in addition, an image is displayed on display 110. In some embodiments, processing system 414 and a modem (not shown) may be powered up, with the modem being used to implement wireless connectivity (e.g. 3G or 4G cell service) to a remote server (not shown) by methods including but not limited to wireless internet access. Other processes could include back/front light control, or light/dark detection.

Transitions between states can be initiated in response to battery and vehicle power levels, sensed capacitive touch, physical button press, an accelerometer event (motion sensed), a cable disconnect (vehicle power disconnected), incoming SMS message (received via the modem), a timer signal, or infrared motion detection. Specifically, some transition triggers are described as follows:

Vehicle Power Removed

When 12V vehicle power is removed from the device, and the battery has sufficient charge (>10%) display system 400 will enter into sleep state. This transition will happen within 60 seconds. When the battery is fully discharged, the device will completely turn off.

Vehicle Power Applied

When 12V vehicle power is applied display system 100 will immediately go into wake state.

Capacitive or Button Touch Recorded

When a touch is sensed display system 100 will transition from sleep to semi-wake state.

Accelerometer Event Sensed—When the accelerometer detects that the display system has been removed from a stationary vehicle.

In some embodiments, display system 400 transitions from sleep state to semi-wake state every 20 minutes, stays in semi-wake state for 1 minute, and then returns to sleep state. In other embodiments, other timing combinations may be implemented depending on the nature of the application. For example, display system 400 may transition from sleep state to semi-wake state every 60 seconds, stay in semi-wake state for 10 seconds, and then return to sleep state.

Returning to FIG. 5, starting from an off state 502 where all systems are powered down, if a condition where vehicle power is applied or battery power is greater than 10% 514 occurs then the system transitions to a wake state 508. If, from wake state 508, a condition where vehicle power is removed or battery power is 0% 512 occurs then the system transitions to off state 502. While in wake state 508, if a condition where vehicle power is removed and battery power is greater than 10% 522 occurs then the system transitions to sleep state 504. Conversely, while in sleep state 504, if a condition where vehicle power is applied 516 then the system transitions to wake state 508. While in sleep state 504, if a condition where battery power is 0% 510 occurs, then the system transitions to off state 502. While in sleep state 504, if a condition where a qualifying event is recorded (for example, a capacitive touch or infrared motion detection as discussed above) or 20 minutes have elapsed since a last state check 518, the system transitions to semi-wake state 506. If a condition occurs where the system is in semi-wake state 506 and 1 minute has elapsed or when the function associated with the qualifying event (recorded in step 518) is fulfilled 520 then the system transitions to sleep state. If a condition occurs where the system is in semi-wake state 506 and the battery power is 0% 524 then the system transitions to off state 502. The flow diagram in FIG. 5 captures the basic state flow process for digital display 100.

Figure 6A:
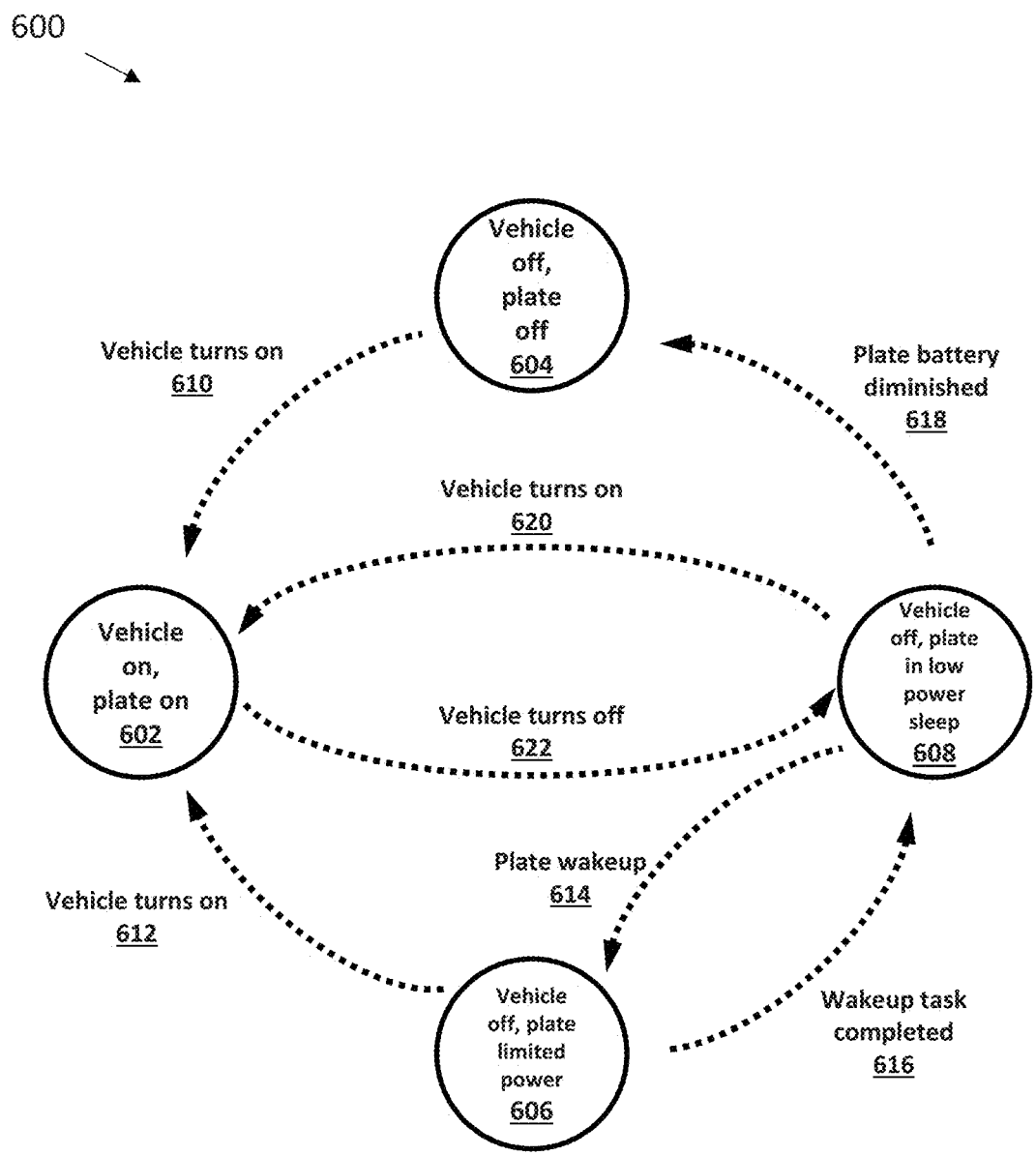
FIG. 6A is a power state diagram for an bistable display.

FIG. 6A is a power state diagram 600 for a bistable display. Advantageously, a bistable display retains its state when external power is removed. In FIG. 6A, the term "plate" is used synonymously to refer to display system 100. Starting at a state where the vehicle is off and the vehicle power is off 604, if an event where the vehicle turns on 610 occurs, then the system switches to a state where the vehicle is on and the plate is on 602. If, in the state where the vehicle is on and the plate is on 602, an event occurs where the vehicle turns off 622, then the system transitions to a state where the vehicle is off, and the plate is in a low-power sleep mode 608. When the system transitions to the state where the vehicle is off, and the plate is in a low-power sleep mode 608, if the digital display 110 is an electrophoretic display, then the information on the display stays static and does not get erased. If the system is in a state where the vehicle is off, and the plate is in a low-power sleep mode 608 and the vehicle turns on 620, then the system transitions back to the state where the vehicle is on and the plate is on 602. If the system is in a state where the vehicle is off, and the plate is in a low-power sleep mode 608 and an event occurs where the plate battery power is diminished 618, then the system transitions to the state where the vehicle is off and the vehicle power is off 604. If the system is in a state where the vehicle is off, and the plate is in a low-power sleep mode 608 and an event occurs where a plate wakeup signal is received 614, then the system transitions into a state where the vehicle is off and the plate operates under limited power 606. Wakeup signals are triggered by any combination of sensed capacitive touch, physical button press, an accelerometer event (motion sensed), a cable disconnect (vehicle power disconnected), incoming SMS message (received via the modem), a timer signal, or infrared motion detection. If the system is in a state where the vehicle is off and the plate operates under limited power 606 and an event occurs where a wakeup task is completed 616, then the system transitions to a state where the vehicle is off, and the plate is in a low-power sleep mode 608. If the system is in a state where the vehicle is off and the plate operates under limited power 606 and an event occurs where the vehicle turns on 612, then the system transitions into the state where the vehicle is on and the plate is on 602.

Some embodiments of display system 100 may include modules, or system components, such as a CPU module configured to perform data processing operations, a modem configured to implement communication protocols, a screen associated with digital display 110, a front light system used to illuminate a screen comprised of a bistable display or a backlight system used to illuminate a screen comprised of an LCD display or some combination of these, a GPS module for positioning, and an On-Board Diagnostics, version II (OBD-II) connection. Each of these modules consumes power, and is affected by system transitions from one state to another.

FIG. 6B presents a table 601 showing how power states affect system components. As seen in FIG. 6B, when the system is in state 602, the CPU is on, the modem is connected, information on the screen is changeable, the front light is on (to illuminate the screen), the GPS module is on, and the OBD-II connection is on. When the system is in state 604, the CPU is off, the modem is off, the information on the screen is frozen on the last image (this information persists since the display is bistable—for example, an electrophoretic display), the front light is off, the GPS module is off, and the OBD-II connection is off. When the system is in state 606, the CPU is on, but operating in a low power mode, the modem is connected, the information on the screen is changeable, the front light is on, the GPS module is off, and the OBD-II connection is off. When the system is in state 608, the CPU is in a suspended mode or low power mode, the modem is in a low power mode, listening, for example, for an SMS wake signal, the information on the screen is frozen on the last image, the front light is off, the GPS module is off, and the OBD-II connection is off.

In some embodiments, vehicle status changes can be initiated in response to voltage changes. For example, a digital license plate can be equipped with an Analog to digital converter (ADC), Accelerometer/Gyroscope, GNSS/GPS receiver, LTE radio, and a Real-Time Clock (RTC). These components can be used to determine if a vehicle is in operation (running), a vehicle is parked (not-running), and whether the vehicle is in motion. Voltage as measured and converted by the ADC to digital form can be used by the digital license plate to determine when a vehicle has shifted from a Parked mode with a normal 12.6-volt state, to an Operation mode with a normal 13.7-volt state. Similarly, a drop in voltage can be used to determine when the vehicle has shifted from an Operation mode to a Parked mode.

Vehicle status changes can also be detected using accelerometer information. For example, an accelerometer reading can distinguish a large impulse acceleration reading from opening or closing a door, from a regular, periodic acceleration due to engine operation.

Vehicle status and digital license plate power state changes can be triggered by vehicle location state, alone or in conjunction with voltage/accelerometer or other sensor data. Location can be determined using GNSS/GPS or LTE location services. For example, upon moving into an ON mode a digital license plate can get its current location from a local stored database. Then, using on board GNSS/GPS or wirelessly connected LTE location services, the location can be updated. If there is a sufficient preset difference (typically on the order of meters), the vehicle can be indicated as in motion, and the mode of the digital license plate switched to an In Motion mode. Alternatively, if the location difference was not greater than the preset value, and the location has not changed for a set time x, then the digital license plate can determine that the car is parked, and the digital license plate switched to a Sleep mode.

Figure 7:
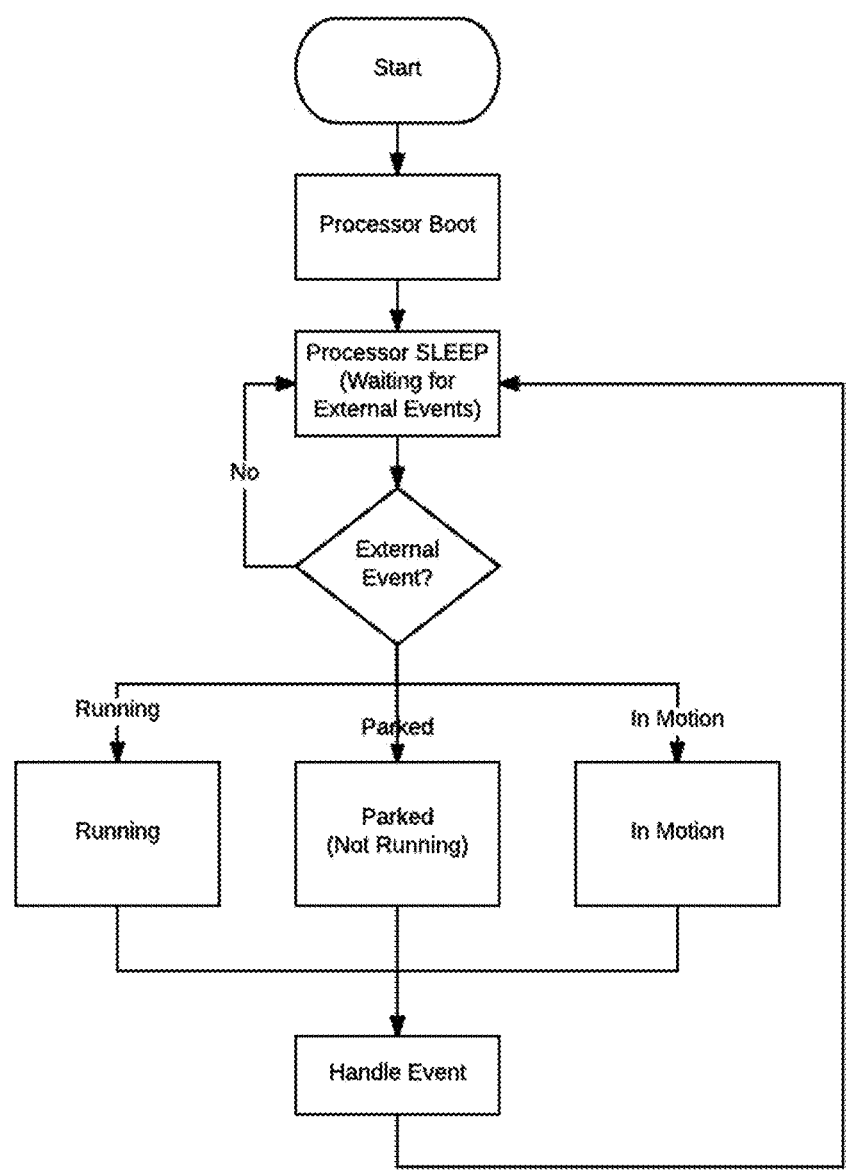
FIG. 7 illustrates a digital license plate operation flowchart.

FIG. 7 illustrates a digital license plate operation flowchart 700. After start and processor boot up of a digital license plate, the processor (and digital license plate) remains in a sleep mode until an external event occurs. A determination made as to whether a vehicle is running, parked (not running), or in motion. The event is handled, and if necessary, one or more suitable mode changes in digital license plate power and communication status are made. In some embodiments, this mode change determination can utilize external information sources such as personal smartphones. For example, a digital license plate can connected to cloud platform using BTLE running on mobile phone. When a person holding a smartphone approaches the digital license plate, it can look for one or more mobile phone with which it is already paired. If one of those mobile phones connects to the DLP, then a prediction is made that the digital license plate is either in drive mode or is about to go to drive mode. Based on this prediction certain mode changes can be made or functionality of the plate can be enabled or disabled.

Figure 8:
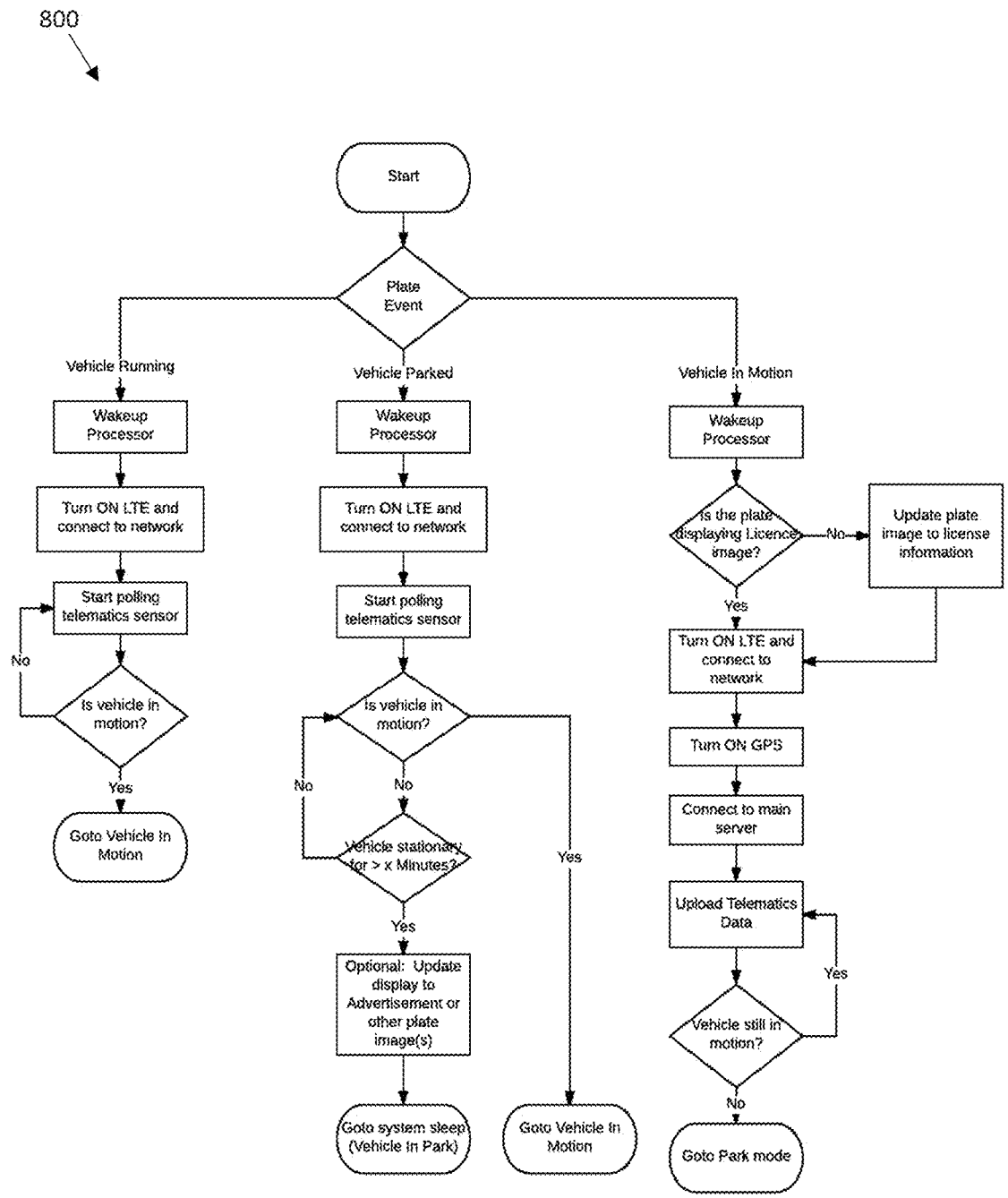
FIG. 8 illustrates a digital license plate wireless connectivity flowchart.

FIG. 8 illustrates a digital license plate long distance wireless connectivity flowchart 800. When a digital license plate event occurs, three major lines of events can occur based on whether the vehicle is running, the vehicle is parked, or the vehicle is in motion. When the vehicle is running, the processor is woken, LTE is connected, and sensors are polled to determine if the vehicle is in motion. If it is, then mode changes suitable for the vehicle in motion are begun. This includes processor wake up, tests to ensure proper license plate image display (or updates to plate image), LTE connection, GNSS/GPS enablement, and connection to external server/cloud for data receipt. Local sensor (i.e. telematic) data can be uploaded to the server/cloud via LTE, and this repeated at regular intervals until the vehicle stops and the digital license plate switches to a parked mode. When vehicle is parked, the processor can be initially maintained in a wake state, LTE connected, and sensor data collected. If the vehicle remains stationary for a predetermined time, the plate image can be optionally updated or changed, and the digital license plate switched to a sleep mode. Otherwise, the vehicle can be switched back to a vehicle in motion mode if necessary.

As will be understood, determining vehicle state and corresponding digital license plate power and communication state can use multiple combinations of the previously described methods discussed. Various statistical, predictive, machine learning, or other techniques for combining and weighting sensor input and external received data, combined or alone, can be used by the digital license plate to determine needed operational mode in response to sensor input or external communication.

Figure 9:
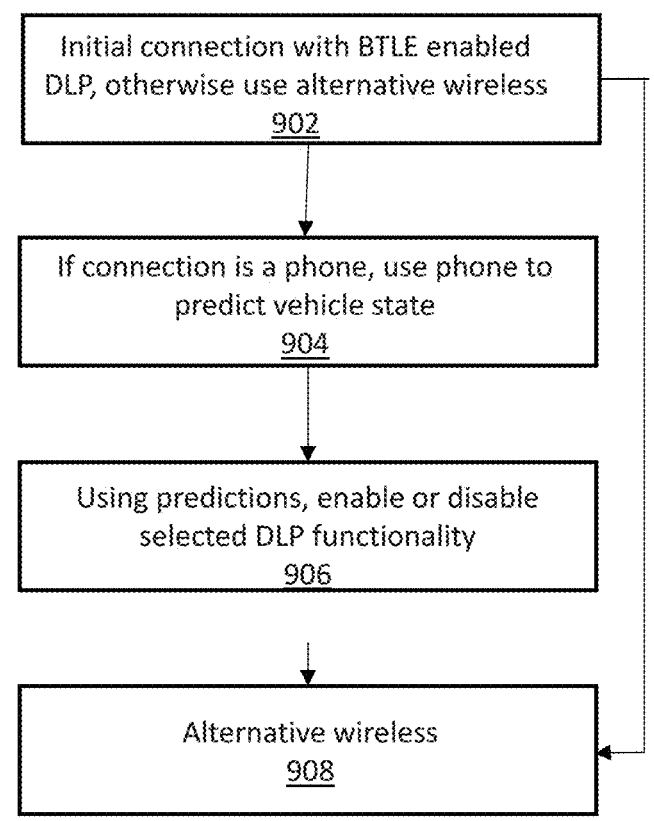
FIG. 9 illustrates a method for low power communication

FIG. 9 illustrates a method of operation of a digital license plate having improved power usage efficiency that can provide better long-term support for power using functions including plate image update, registration, renewal, software update, Amber alerts, or notifications via mobile phone. In one embodiment, a digital license plate is equipped with Bluetooth Low Energy (BTLE) wireless personal area network technology. BTLE technology operates in the spectrum range 2.400-2.4835 GHz ISM band, and has 40 2-MHz channels. Within a channel, data is transmitted using Gaussian frequency shift modulation at a typical bit rate of 1 Mbit/s, and the maximum transmit power is 10 mW. Narrowband interference problems are reduced various frequency hopping or direct-sequence spread spectrum. Additionally, power profiles can be optimized for a digital license plate and various digital license plate applications using Generic Attribute Profile (GATT). GATT operations can include discovery of identifiers (UUIDs) for all primary services, including finding a service with a given UUID, finding secondary services for a given primary service, discovering all characteristics for a given service, finding characteristics matching a given UUID, and reading all descriptors for a particular characteristic.

Commands can be provided to read (data transfer from server to client) and write (from client to server) the values of characteristics. A value may be read either by specifying the characteristic's UUID, or by a handle value (which is returned by the information discovery commands above). Write operations can identify the characteristic by handle. Notification and indications. The client may request a notification for a particular characteristic from the server. The server can then send the value to the client whenever it becomes available. For example, an acceleration sensor server may notify its client every time it takes a measurement. This avoids the need for the client to poll the server, which would require the server's radio circuitry to be constantly operational. Further details are given in Volume 6 Part A (Physical Layer Specification) of the Bluetooth Core Specification V4.0.

Using GATT defined profiles in conjunction with a suitable application programming interface can result in very low power usage as compared to traditional Bluetooth systems. As seen in FIG. 9, a BTLE enabled digital license plate can greatly reduce power consumption and maximize battery life using the following steps 900. In step 902, a first connection is attempted and made via BTLE. If a connection is not made after several attempts, alternative (and higher power usage) wireless technologies are the attempted in step 908. These alternative wireless connections can be via routers or wireless hotspots at home, at work, in-vehicle, or through commercial or public WiFi systems. If WiFi is not available, very high-power usage LTE connections can be attempted. Typically, BTLE connection attempts are most frequently made, followed by WiFi, and infrequently LTE. In some embodiments, a smartphone or other user interface device can be set to provide notifications if wireless connections have not occurred within designated time intervals or during selected events (e,g, using a vehicle) to enable troubleshooting.

In one embodiment using the methods discussed with respect to FIG. 9, a digital license plate can connect to cloud platform using BTLE running on mobile phone. As previously noted, in step 902 the digital license plate will look for one or more mobile phone with which it is already paired. If one of those mobile phones connects to the DLP, then a prediction is made that the DLP plate is either in drive mode or is about to go to drive mode. Based on this prediction certain functionality of the plate can be enabled or disabled. For example, a targeted message can be retrieved by the mobile phone for transmission to and display on the DLP. In effect, the available electrical power and processing power of the mobile phone is used in conjunction with a low power BTLE connection to control a DLP, instead of high power usage by the on-board WiFi or LTE systems of the DLP. This is of particular use for DLP systems not connected, or only intermittently connected, to vehicle power systems.

In addition to power reduction improvements for the DLP, the described embodiments can improve information transfer and responsiveness, as well as providing additional information such as GNSS/GPS location or car parking authorization. As another example, when an Amber alert is published; based on the location of a customer living in the area of the alert a message can be sent via mobile phone to those customers requesting a plate update. If the customer is in the car, the plate will be updated via a BTLE connection. This has the advantage of quickly presenting an Amber alert on the DLP, without requiring an LTE connection from the DLP.

In another embodiment related to parking, a customer can use a mobile phone application to provide parking notices, payments, or authorization. All payments and processing can be handled by the mobile phone, and only the final parking authorization image (e.g. parking sticker) is transferred to the DLP by BTLE, with the majority of power usage occurring on the mobile phone. For those situations when a customer and mobile phone do not retrieve the vehicle (and associated digital license plate) the parking authorization can either be deleted (e.g. short term parking stickers or person specific handicap stickers) or set to remain (e.g. long term vehicle parking stickers) by the DLP, depending upon previously set DLP instructions.

A suitable thermal control system such as discussed briefly with respect to FIG. 2 is also useful for ensuring reliable operation under a range of conditions. As discussed with respect to FIG. 1, display system 100 may be mounted on the exterior of a vehicle, and may be subject to a range of temperatures. Furthermore, display system 100 generates heat due to power dissipation in the associated components such as display 110. In some conditions, it might be important to prevent display system 100 from overheating. Presented below is a description of how overheating effects in display system 100 can be reduced. One strategy to regulate the amount of heat generated is to reduce the brightness of display 110 in accordance with the detected temperature associated with display system 100.

Figure 10:
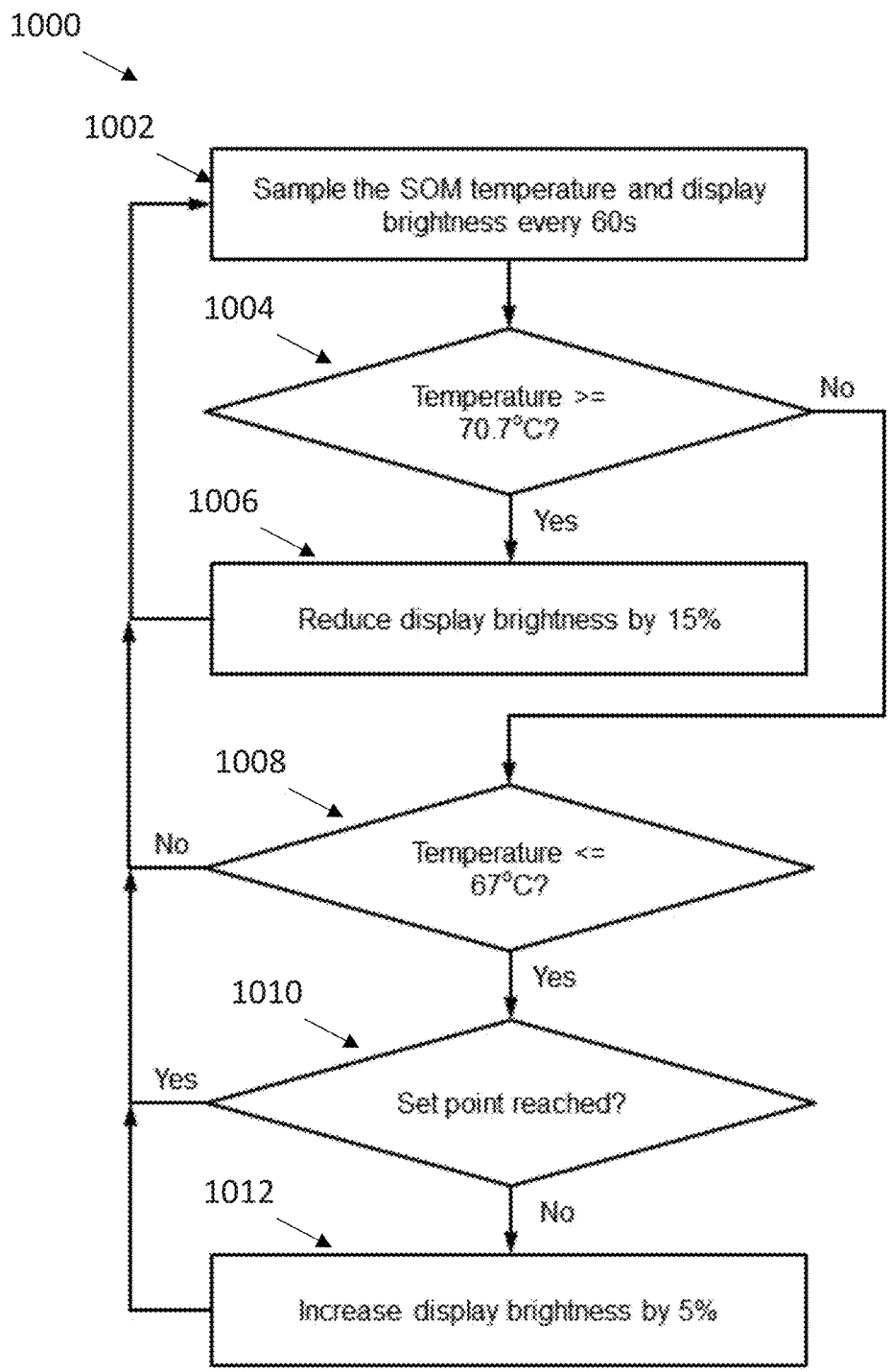
FIG. 10 is a flowchart illustrating a temperature management method.

The current maximum allowable temperature of the device is set at a defined temperature as read by a system-on-microprocessor (SOM) sensor. To ensure that this temperature is not reached, the upper temperature limit needs to be some amount lower than this. FIG. 10 depicts a flow diagram illustrating one embodiment of a method 800 to implement such brightness control logic. At 1002, the method samples the SOM temperature and display brightness at defined time intervals (e.g. every 60 seconds). At 1004, the method checks to see whether the temperature is greater than or equal to 70.7° C. If the temperature is greater than or equal to 70.7° C., the method proceeds to 1006, where the method reduces display brightness by 15%, after which the method returns to 1002. At 1004, if the temperature is not greater than or equal to 70.7° C., then the method goes to 1008, where it checks to see whether the temperature is less than or equal to 67° C. If the temperature is not less than or equal to 67° C., then the method returns to 1002. If, at 1008, the temperature is less than 67° C., the method goes to 1010, where it checks to see if a set point has been reached, where the term "set point" is used to refer to a predetermined brightness value. If the set point has been reached, then the method returns to 1002, otherwise the method goes to 1012, where it increases the display brightness by 5% or any other preset value and returns back to 1002.

In effect, a lower temperature threshold is set, below which point the screen brightness will be increased. Once the display system has reached safe temperatures, the brightness should begin to increase back towards the set point slowly so that the device does not get stuck in a loop of increasing and decreasing the brightness. Since brightness is being stepped down at 15% increments, the brightness will be increased at 5% increments once the temperature is below the set value. This built-in hysteresis prevents it from getting stuck in a loop of changing the brightness. In some embodiments, a quicker sampling rate may allow for finer adjustment of the brightness at the risk of false actions taken due to noise in the temperature sensor. The brightness set point can be generated from the ambient light sensor in the device on boot up, and recalibrated every 60 seconds thereafter.

Figure 11:
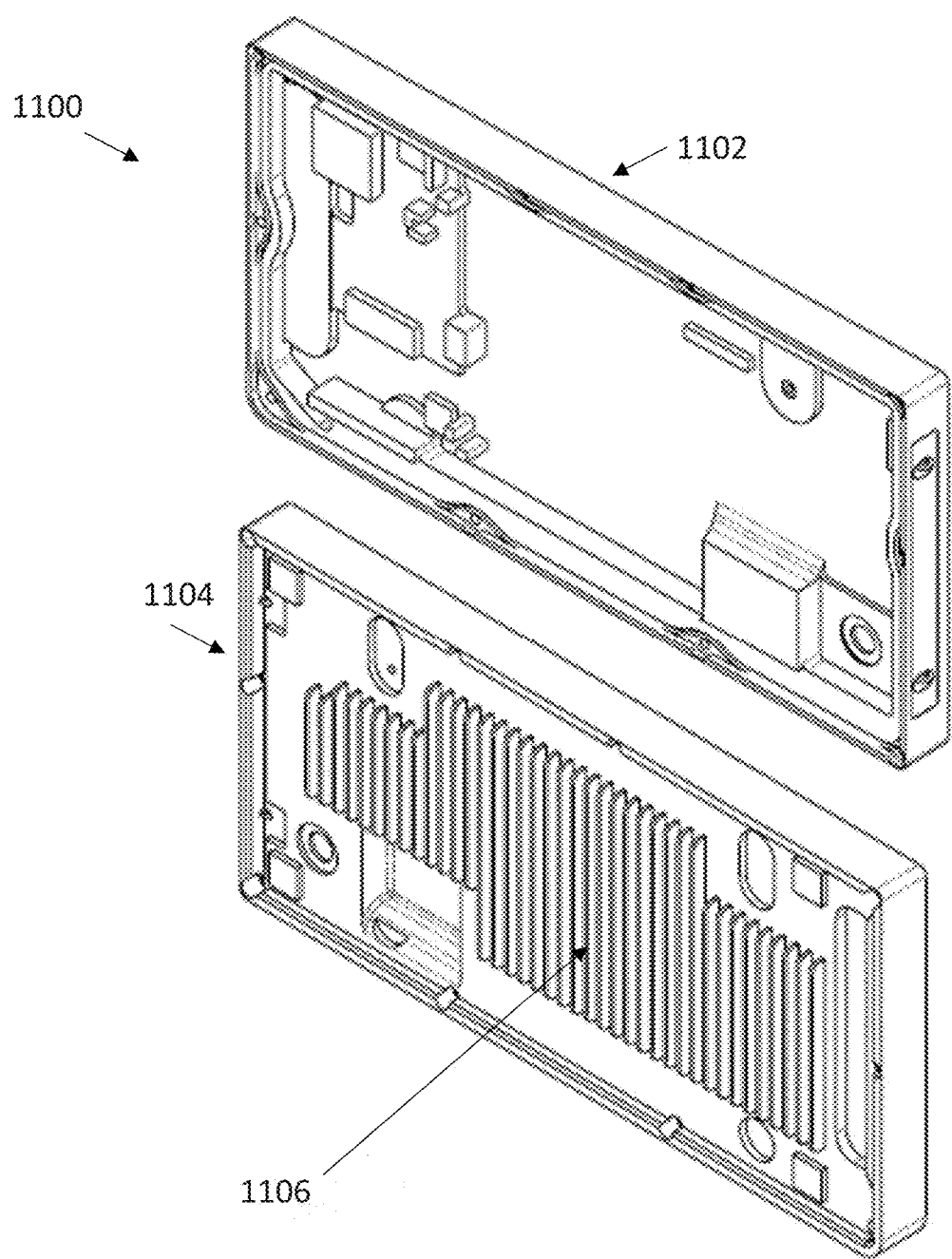
FIG. 11 illustrates structural elements for thermal management.

Various structural features of the digital display of a digital license plate can aid in heating and cooling. For example, FIG. 11 depicts two views 1100 of a bezel, illustrating cooling fins. The view in FIG. 11 shows a bezel 1102 that functions as a frame surrounding digital display 1110. 1104 is an alternate view of bezel 1102, showing a set of cooling fins 1106. Cooling fins 1106 function to radiate heat away from the digital display, helping reduce the heating rate associated with digital display.

In some embodiments, heat conduits may be included as a part of bezel 1102, where heat conduits contact circuit board components directly to funnel heat away, and may also include some sort of heat-transfer compound (possibly in the form of a gel or paste) to help with heat conduction. Other embodiments may use thermoelectric cooling (e.g. Peltier devices) to provide active cooling for the display system.

In some embodiments, a digital display may be a bistable display. Under low operating temperatures, a bistable display may need to be externally heated for the bistable display to correctly transition. Under high operating temperatures, there can be difficulties in switching unless the bistable display is maintained below a defined temperature, or at least temporarily cooled. Due to the differences in the operating temperatures of bistable displays and an LCD, temperature controls might be programmed differently with the bistable display versus the LCD.

Bistable displays can include pigmented microspheres in an electrophoretic display containing white and black pigment material and addressing using transparent electrodes and a pixel electrode. Such bistable displays are commonly available from E Ink Corporation. Alternative embodiments using only a single pigment material and a colored oil are also possible. In those embodiments, the electrophoretic dispersion has one type of charged pigment particles dispersed in an oil or oil mixture of a contrasting color. When a voltage difference is created between a transparent electrode and a pixel electrode, the pigment particles migrate electrode of polarity opposite that of the pigment particles. The color showing at the transparent electrode may be either the color of the solvent or the color of the pigment particles. Reversal of electrode polarity will cause the particles to migrate back to the opposite pixel electrode, thereby reversing the color.

Performance of such bistable displays can be improved for digital license plates such as discussed herein. For example, to improve readability, white pigment particles can be formed from, or associated with, materials that reflect infrared light. This improves readability using infrared sensitive camera systems. In another embodiment, for improved twilight or low light readability, the white pigment particles can be formed from, or associated with, materials that fluoresce or are phosphorescent. In still other embodiments, the white pigment particles can be formed from, or associated with, heat rejecting or heat absorbing materials that reduce or increase temperature to help maintain the bistable display of the digital license plate within operational temperature limits.

Under low operating temperatures, a bistable display may need to be externally heated for the bistable display to correctly transition. At low temperatures, the e-ink may need an external source of heat in order for it to be able to transition, since the lower bound of its operating temperature range is higher than LCDs. Attached heating elements, heating pipes, battery or vehicle powered heating elements can all be used to ensure that the bistable display is maintained or temporarily brought above the minimum display switching temperature when switching is required. Use of a heating element allows, for example, activation of a heater to bring the display above the minimum display switching temperature, followed by deactivation of the heater and consequent drop in temperature below the minimum display switching temperature. Other components that might be heated other than the bistable display may include any associated circuit boards, and the battery system.

For embodiments without associated heaters (or when the heater does not generate sufficient heat to compensate for cold temperatures), operation of the bistable display can be adjusted to compensate. For example, in one embodiment, as temperature is reduced near to a lower operational temperature limit, the digital license plate can be set to display only the legally required information. Advertisements that could interfere with display of legally required information or dynamic displays that could partially or completely fail to switch due to cold temperatures would not be allowed. In effect, for example, a vehicle maintained in a heated garage would be able to display the full range of visual effects possible in the digital license plate. If the vehicle moves into an environment with sub-zero temperatures, a temperature sensor could provide warning data of low temperature conditions, the digital license plate would switch to a display of only the legally required information or information that would not interfere with viewing of the legally required information. Similarly, embodiments that with active or passive cooling systems can support methods to ensure that the digital license plate will switch to a display of only the legally required information or information that would not interfere with viewing of the legally required information before temperatures reach a maximum display switching temperature.

Critical temperatures vary according to material and type of display. For example, an e-ink bistable display may have a normal operating temperature range above 0 degrees Celsius and below 50 degrees Celsius. Actions to compensate for low or high heat conditions can begin before a critical temperature is reached. For example, a display pattern that impacts reflectivity can be adjusted to increase reflectivity as the sensed temperature increases above 40 degrees Celsius. Optional cooling elements can be activated if the temperature continues to increase, and the display can be locked into a non-switching state if temperature continues to rise, with the digital license plate acting to display only the legally required information or information that would not interfere with viewing of the legally required information. Similarly, at low temperatures, display pattern (reflectivity) can be adjusted to decrease reflectivity (i.e. increase absorption) as the sensed temperature decreases below 10 degrees Celsius. Optional heating elements can be activated if the temperature continues to decrease, and the display can be locked into a non-switching state if temperature continues to fall, with the digital license plate acting to display only the legally required information or information that would not interfere with viewing of the legally required information. Typically, actions taken to compensate for high or low heat conditions begin within 15, 10, or 5 degrees Celsius of the critical temperature, and can be ordered so that actions requiring little or no power or having a low visual impact are implemented before actions requiring a substantial amount of power or having a greater impact on display messaging are implemented.

As will be understood, temperature of a display can be directly or indirectly measured. Electronic thermometers with associated temperature control modules can be attached to the display, attached near or in the vicinity of the display, or attached somewhere on a vehicle. Ambient temperatures can be measured, and an indirect determination of likely display temperature can be made. In certain embodiments, predicted temperatures can be used. For example, if the digital license plate receives predicted or calculated overnight temperature information, protective measures can be immediately engaged when the vehicle is parked near the end of a day. While not as accurate as direct measurement of the display temperature, ambient or other indirect temperature measurement can be accurate enough to engage protective measures when needed as critical temperatures are approached.

In one embodiment, a display system supporting modifiable heat relevant display parameters includes a temperature sensor positioned to measure temperature of the display system. A temperature control module can be connected to the temperature sensor and configured to modify heat relevant display parameters as critical temperatures are approached. Modifiable heat relevant display parameter includes brightness, with brightness being increased as critical low temperatures are approached and decreased as critical high temperatures are approached. In another embodiment, the modifiable heat relevant display parameter includes a displayed pattern to modify reflectivity, with the displayed pattern being modified to increase heat absorption as critical low temperatures are approached and modified to decrease heat absorption as critical high temperatures are approached.

Applications of display system 100 are not limited only to vehicle license plates. For example, the display 110 can be composed of multiple homogeneous tiles, a large heterogenous display with inset tiles (e.g. an electrophoretic display with LED display sections), or have distinct color and bistable sections. In addition, the display system can control multiple additional displays positioned on the interior or exterior of a vehicle. For example, such displays may be tiled and placed on the side of a bus. Tiling displays may increase the number of options available to present media to an intended audience. Some embodiments include a larger display (say 16"×16" for example), a portion of which can show the plate image, while the rest can be used for static messaging. This way messages and plate image can be displayed simultaneously.

Displays can include multiple sub-displays. In some embodiments, displays may be comprised of sub-displays of similar or different kinds tiled together. For example, an outer frame display may be configured to display vehicle license and registration information, while a sub-display may display different advertising and/or promotional messages. In other embodiments, an outer frame display and sub-displays may be comprised of different display kinds (e.g. bistable, OLED, LCD).

Measures to prevent display system 100 from damage from, for example, road debris may include physical protective covers made from, for example, Plexiglas or sapphire crystal. Hydrophobic coatings may be applied to the exterior surface of display system 100 to prevent damage due to exposure to liquids such as water. In other embodiments, self-cleaning glass using nanocrystalline titanium dioxide coatings, plasma-chemical roughening, photo-catalytic cleaning structures, molded polymeric layers, or other suitable hydrophobic or hydrophilic system can be used.

Figure 12:
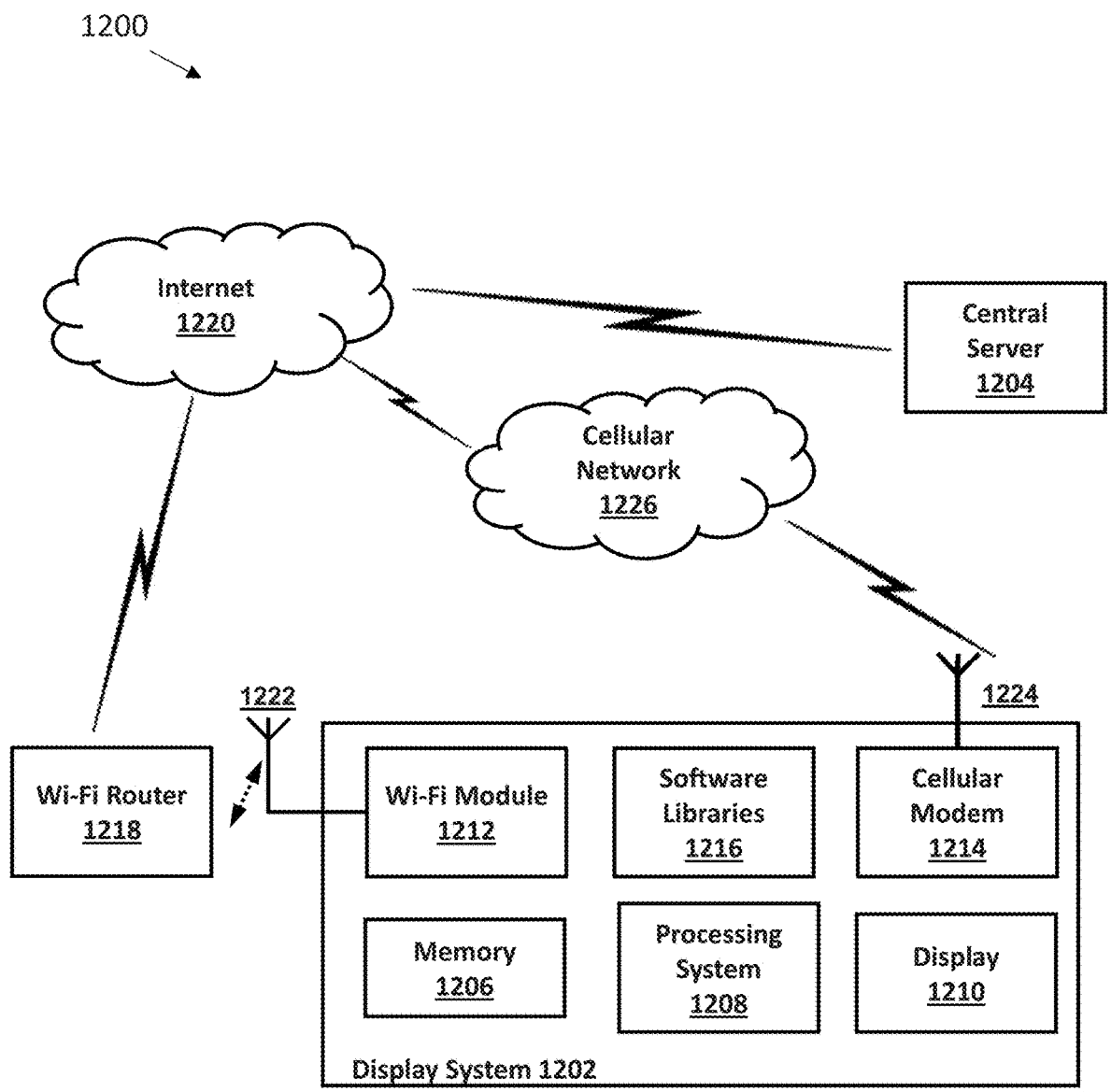
FIG. 12 is a diagram illustrating communication schemes.

FIG. 12 is a diagram illustrating communication schemes associated with a digital system 1202. In some embodiments, display system 1202 includes a processing system 1208, a display 1210, and a memory module 1206. Processing system 1208 is configured to perform, for example, data processing operations associated with display system 1202. Memory module 1206 may be configured to store temporary or long-term data. Display 1210 may be configured to display the information content presented in the foregoing description. Display system 1202 may also include a cellular modem 1214 and an associated cellular antenna 1224. Cellular modem 1214 is configured to make a connection to the internet 1220 via a cellular network 1226. Display system may include an operating system that includes a software libraries module 1216, where software libraries module 1216 is configured to allow applications running on display system 1202 to communicate to the internet 1220 via cellular network 1226. The low-level communication with the cellular network is handled by the baseband processor (not shown) inside cellular modem 1214. Layered on top of that are the internet protocols that manage the data connection with the internet 1220. These are managed by the code libraries that are supplied as part of the installed operating system. This operating system also provides an interface that allows applications to communicate with these libraries and by doing so they are able to send and receive data over the network.

Display system 1202 also has a Wi-Fi module 1212 coupled to a Wi-Fi antenna 1222 that allows it to utilize a Wi-Fi network generated by a Wi-Fi router 1218 as an alternate way to connect to the internet 1220. As in the cellular case, there are software libraries running on the processing system 1208 that interact with and control the Wi-Fi module 1212 and that allow applications to utilize the Wi-Fi network to pass data to and from the internet 1220. There is a central server 1204 that is remote from display system 1202 that is connected to the internet 1220, enabling display system 1202 to address and communicate with it via standard internet protocols.

Display system 1202 communicates with central server 1204 to obtain configuration information and to download assets. The application running on central server 1204 is called the "plate service," and is interacted with via a representational state transfer (RESTful) interface. All traffic between the any number of display systems such as display system 1202 and the plate service is encrypted using industry-standard SSL/TLS protocols. In addition, the display systems and central server 1204 verify each other's identities by checking that they are each presenting a valid x.509 SSL certificate. In the case of the central server 1204, this SSL certificate is signed by a valid public certificate authority (CA) tied to a root certificate that is recognized by the plate. Display system certificates, also known as client certificates, are self-signed by a CA owned or controlled by the issuer of the display systems, and the relevant root certificate is installed on the central server 1204 running the plate service so that it can validate these client certificates. The digital license plate obtains a valid client certificate during the provisioning process from a separate public key infrastructure (PKI) server that is responsible for generating and revoking these client certificates. This PKI server requires that the plate initially present a separate factory client certificate that is installed with the plate software. This factory certificate is only used during provisioning (initialization of a digital display)) to obtain a new client certificate from the PKI server. Without one of these client certificates the digital license plates are unable to communicate with the plate service.

Figure 13:
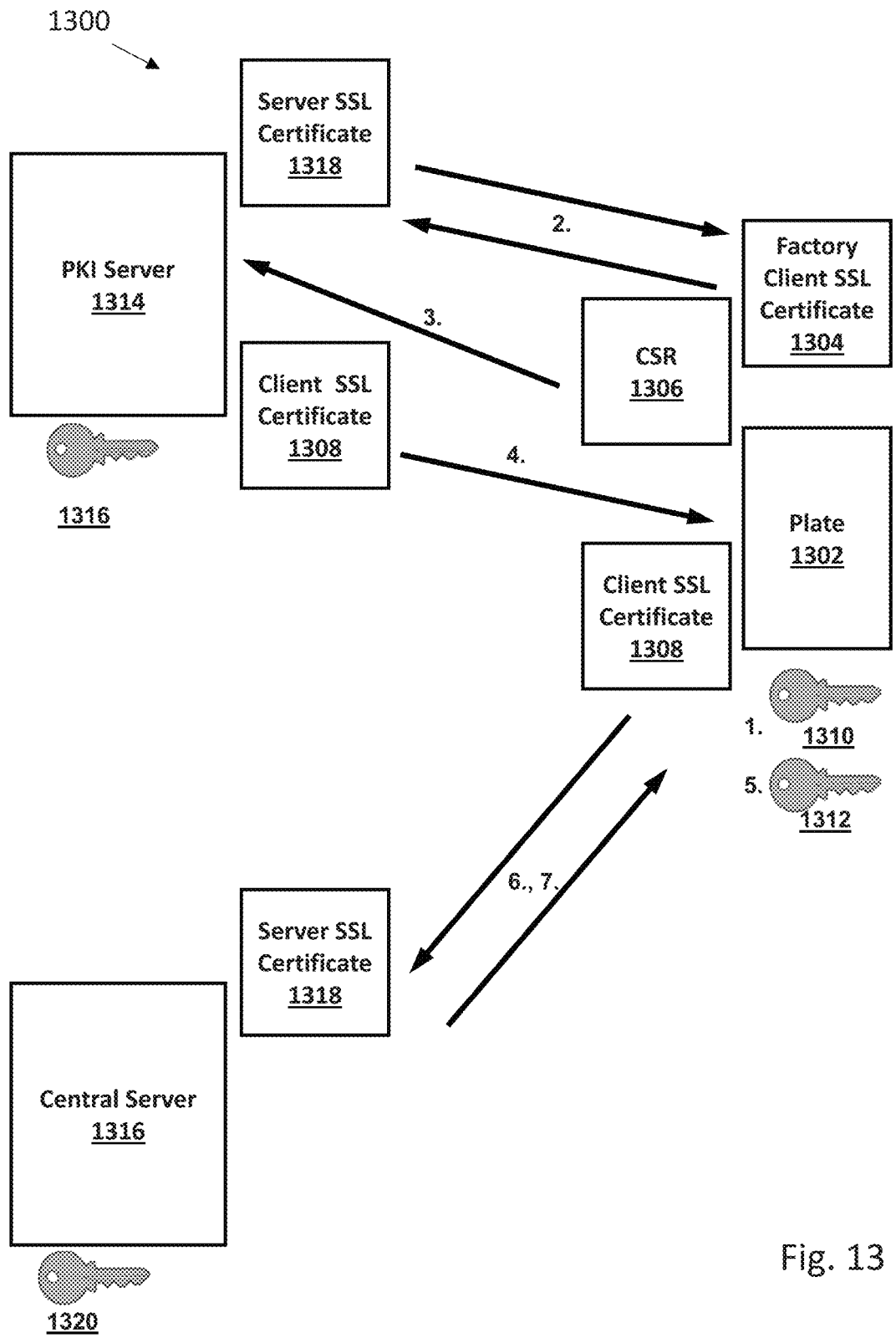
FIG. 13 depicts a method for provisioning, or initializing, a display system.

FIG. 13 depicts a method 1300 for provisioning, or initializing, a display system, also referred to herein as a "plate" or a "digital license plate." A digital license plate (plate) 1302 that is unprovisioned will first attempt to provision itself. Referring to FIG. 13, the provisioning process is accomplished in the following steps.

1) The plate 1302 generates a private key and a certificate signing request (CSR) 1306. The plate 1302 generates a private key 1310 for this transaction.

2) The plate connects to a PKI server 1314 via SSL/TLS. In some embodiments, PKI server 1314 may be an NGINX server. During the setup of this secure connection the plate verifies that the SSL certificate presented, referred to as a server SSL certificate 1318, by the PKI server 1302 is valid. The PKI server 1314 asks the plate 1302 to provide a client SSL certificate of its own. The plate 1302 sends the PKI server 1314 a factory client SSL certificate 1304, which is verified as valid by the PKI server 1314. If both PKI server 1314 and plate 1302 are satisfied that the certificates presented by the other entity are valid, then the connection is established and communication can proceed. PKI server 1314 may generate its own private key 1316 for this transaction.

3) The client sends the CSR 1306 generated in step 1 to the PKI server 1314 and requests a new client SSL certificate 1308.

4) The PKI server 1314 verifies the information in the CSR 1306 and then generates a new client SSL certificate 1308 and sends it to the plate 1302 in its response.

5) The plate stores the new client SSL certificate 1308 along with the private key 1310 generated in step 1. These are then used in all subsequent communications with a central server 1316 running the plate service application. The factory client SSL certificate 1304 has no further role.

6) The plate 1302 now connects with the central server 1316 running the plate service application. In some embodiments, central server 1316 may be an NGINX server. Again, a SSL/TLS connection is set up, and again there is a two-way verification of credentials where the plate 1302 verifies the server SSL certificate 1318 against its stored catalogue of valid root certificates, and the central server 1316 verifies that the plate 1302 is presenting a valid client SSL certificate 1308 by checking it against the configured self-signed root certificate. As before, assuming all information is validated, an encrypted connection is established. In some embodiments, central server 1316 may generate a private key 1320.

7) The plate 1302 sends a series of requests to the plate service, presenting its serial number and asking to download a number of assets that are required to fully configure the plate. These include the number plate image, number plate overlay image, and the runtime software. After these are downloaded they are installed in the plate. This ends the provisioning process.

Figure 14:
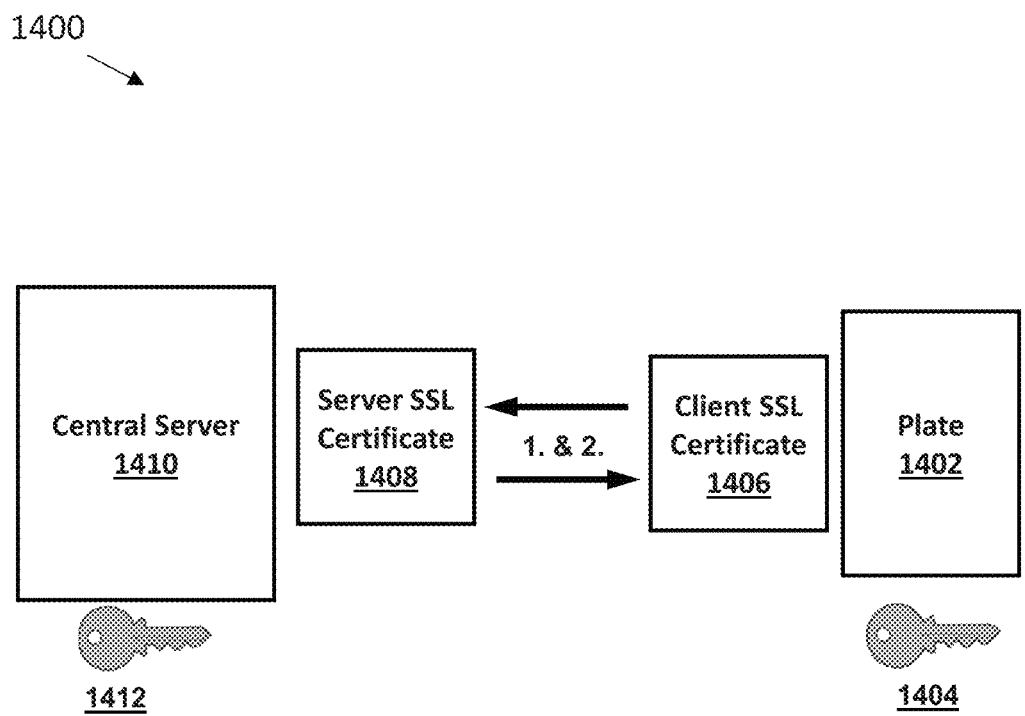
FIG. 14 depicts the interaction between a provisioned plate and a central server.

FIG. 14 depicts the interaction 1400 between a plate 1402 that is provisioned and a central server 1410. In some embodiments, the central server 1410 may be identical to central server 1204. A provisioned plate 1402 will regularly contact the central 1410 server to either download configuration information and assets, or to upload location information, log files, and other data. Referring to FIG. 14, this interaction consists of the following steps:

1) The plate 1402 contacts the central server 1404 running the plate service and establishes a SSL/TLS connection. During this connection establishment the central server and plate exchange SSL certificates that include a client SSL certificate 1406 and a server SSL certificate 1408, and each verify that the other party's certificate is valid (just like was done during the provisioning process). Once security checks are passed, the encrypted SSL/TLS connection is established. Transactions between plate 1402 and central server 1410 may involve the generation of a client-side private key 1404 and a server-side private key 1412.

2) With the encrypted connection now established and the identity of both the central server 1410 and the plate 1402 verified, the plate 1402 is free to send its requests to the central server 1410—either to download information or to upload data, and the central server 1410 responds as appropriate. With each request the plate 1402 will send its serial number so that the central server 1410 may identify the plate 1402 and ensure that each request is handled appropriately. The serial number may also be present in the client SSL certificate that the plate 1402 presents to the central server 1410, providing an additional method for verifying the identity of the plate 1402.

Figure 15:
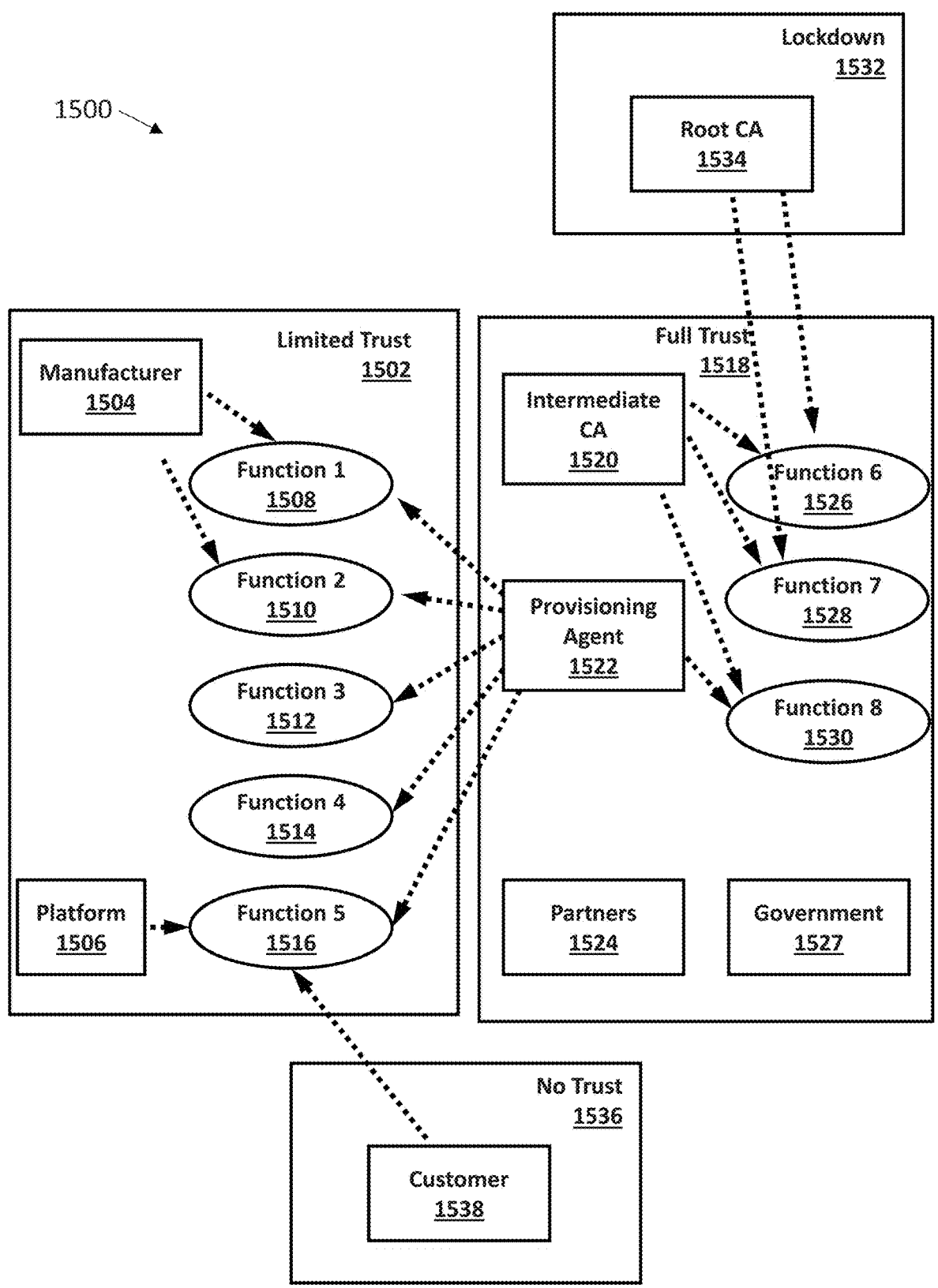
FIG. 15 depicts software security features.

FIG. 15 depicts software security features 1500 associated with the initialization, or provisioning and ongoing use of a display system 100, or a digital license plate. Some embodiments implement software security using an existing X.509 security standard. The X.509 standard is defined by the ITU and was originally specified as part of the ANSI X.500 standard. The purpose of the X.509 standard is to introduce identity assurance capabilities to a directory system in which parties must verify peer identities before allowing connectivity.

The X.509 standard specifies the format of a public key certificate. A certificate is used to bind an identity to a public key by virtue of a signature of assurance from a trusted CA (Certificate Authority). A typical X.509 public key certificate is made up of the following types of information:

Version
Serial Number
Algorithm ID
Issuer
Validity
Not Before
Not After
Subject
Subject Public Key Info
Public Key Algorithm
Subject Public Key
Issuer Unique Identifier (optional)
Subject Unique Identifier (optional)
Extensions (optional)

X.509 also specifies certificate extensions that may be added to a certificate to indicate its intended usage. For example, a CA may issue a certificate to a web server for the purpose of securing SSL connections. By adding an extension, the CA provides concrete guidance on intended key usage, and that any usage of said key outside of this provision is not supported or certified.

X.509 Attribute Certificates (AC): An AC is used to certify a specific action or set of actions that is permissible to the signing CA. Typically, an AC will contain the following information:

Version: the version of the certificate.
Holder: the holder of the certificate.
Issuer: the issuer of the certificate.

Signature algorithm: the algorithm by which the certificate is signed.

Serial number: the unique issuance number given by the issuer.

Validity period: the validity period of the certificate.

Attributes: the attributes associated to the certificate holder.

Signature value: the signature of the issuer over the whole data above.

FIG. 15 depicts an embodiment of a structure in which different participants are admitted into the security scheme, with each participant having different privileges.

Each of the participants described above is assumed to be a separate logical and functional software module. As part of good security policy, each party should be operated as distinct services with no comingling of resources or code libraries. By separating these concerns, the provider of display system 100 and any associated services may build in resilience to failures and security attacks.

Returning to FIG. 15, a root CA 1534 is shown, operating with a lockdown capability 1532. Root CA 1534 is responsible for providing assurance of identity for all sub-modules distributed by the provider of the display systems and associated services. Root CA 1534 typically only certifies other CAs, which are called "Intermediate" CAs. By isolating the Root CA, the provider of the display systems and associated services can ensure that compromised modules may be revoked and retired without compromising the integrity or operation of the rest of the infrastructure. Lockdown capability 1532 can be used in an emergency to lock down and disable all systems if necessary. It is vital that the private key associated with Root CA 1534 remain within a trusted hardware device and that this device shall have no network connectivity whatsoever.

Also shown in FIG. 15 is a full trust group 1518. Full trust group 1518 includes an intermediate CA 1520 (as discussed above), a provisioning agent 1522, a partners group 1524, and a Government entity group 1527. Partners group 1524 may include entities that are partners with the provider of the display systems and associated services. Government entity group 1527 may include Government agencies such as the DMV. Entities included in full trust 1518 have a set of functions that they are allowed to perform, as discussed subsequently. Also defined is a limited trust group 1502, where limited trust group 1502 may include a manufacturer 1504 and a platform 1506. Entities included in limited trust group 1502 have limited functions that they can perform with regards to the display system ecosystem, as described subsequently. Manufacturer 1504 may be an entity responsible for manufacturing one or more components of display system 100, while platform 1506 may be responsible for implementing post-provisioning functions on a display system such as display system 100. Also defined is a no trust group 1536. A customer 1538 is included in no trust group 1536, where customer 1538 is restricted to performing a very limited set of operations, as discussed below.

Lockdown 1532 works by using Root CA 1534 to revoke the validity of Intermediate CA 1520. Once that is done, the trust within full trust group 1518 provided by intermediate CA 1520 is also revoked, and so communication between entities in that domain that use credentials validated by intermediate CA 1520 no longer work.

In some embodiments, entities may be associated with one or more functions that are performed. These functions, as shown in FIG. 15 are described below:

A function 1 1508, where function 1 1508 may be associated with issuing a provisioning ticket. This is an X.509 Attribute Certificate (AC) that is signed by the provider of the plate service and acts as a one-time use ticket that allows the bearer to initiate a display system provisioning ceremony. The purpose of this ticket is to ensure that only valid display system devices are allowed to enroll and be issued secure credentials.

A function 2 1510, where function 2 1510 may be associated with issuing a manufacturing receipt. This is an X.509 Attribute Certificate (AC) that is signed by the provider of the plate service and memorializes a manufacturing event that represents a "Ready for Provisioning" state. This AC is installed on the display system at manufacturing time and may be pre-generated in sequence so that the Manufacturer does not need to participate directly within the PKI associated with the provider of the plate service.

A function 3 1512, where function 3 1512 may be associated with verifying a provisioning ticket. This is to verify the ticket issued by 1508 prior to provisioning, to validate that the plate is ready and OK to provision in the system.

A function 4 1514, where function 4 1514 may be associated with provisioning a receipt associated with the issuance of a display system such as display system 100. This is an AC that is signed by the provider of the plate service and acts as a receipt of a successful provisioning ceremony. This receipt may be logged and/or stored on the display system in order to provide assurance of provisioning at a later time. The purpose of this receipt is to memorialize an event in time in order to provide non-repudiation in the event of a dispute or proof of authenticity when communicating with a suspected spoofed display system device.

A function 5 1516, where function 5 1516 may be associated with operating a display system such as display system 100. This is the 1410 Plate Service shown in FIG. 14 and described earlier, as well as Plate Service 1316 in FIG. 13.

A function 6 1526, where function 6 1526 may be associated with issuing certificates that may include security certificates.

A function 7 1528, where function 7 1528 may be associated with revoking certificates. This is the ability to revoke a set of credentials, and thus lock a plate or an entity out of the system. So for example, we could revoke the client certificate of a specific plate, which would cause the validation steps described previously above to fail, thus preventing the plate from communicating with the platform.

A function 8 1530, where function 8 1530 may be associated with issuing and verifying certificates and tokens associated with system security. This is basically the PKI Server 1314 from FIG. 13. It can be used to issue certificates for other entities as well.

In some embodiments, each entity shown in FIG. 15 may be associated with a specific subset of the functions described above, with a non-association between a specific entity and a function possibly implying that the entity is unable to carry, execute or perform the non-associated function. For example, manufacturer 1504 may be associated with function 1 1508 and function 2 1510. Platform 1506 may be associated with function 5 1516. Customer 1538 may be associated with function 5 1516. Root CA 1534 may be associated with function 6 1526 and function 7 1528. Intermediate CA 1520 may be associated with function 6 1526, function 7 1528 and function 8 1530. Provisioning agent 1522 may be associated with function 1 1508, function 2 1510, function 3 1512, function 4 1514, function 5 1516, and function 8 1530. The distinct classification of the functions that each entity is permitted to perform is essential in establishing and maintaining system security.

Various anti-theft features are contemplated. In some embodiments, anti-theft features are comprised of four components—a communication component, a physical component, an alert component, and a value component. In some embodiments, communication component may be intended to communicate theft challenges as theft-deterrent messages. For example, a security label on the device (i.e. display system 100) may advertise anti-theft features via messaging that indicates that the device is equipped with a GPS tracking device, and that if the alarm is activated in the event of a theft, a message will be sent to the police and the owner. In other embodiments, physical component may use, for example, custom anti-theft screws, hidden bolt heads and pry-resistant designs to make the process of physically removing the device difficult. Alert component may include the ability to detect an unauthorized disconnection of the device from the associated vehicle, and the corresponding display of a warning message on digital display 110. An example warning message could communicate to a potential thief that the device has been detected as stolen and that the device is being tracked by GPS. Value component may involve implementing security features to render the device unusable in the event of theft. Security features that can be implemented may include cryptographically-generated identification numbers, as well as hardware- and software lockouts.

Figure 16:
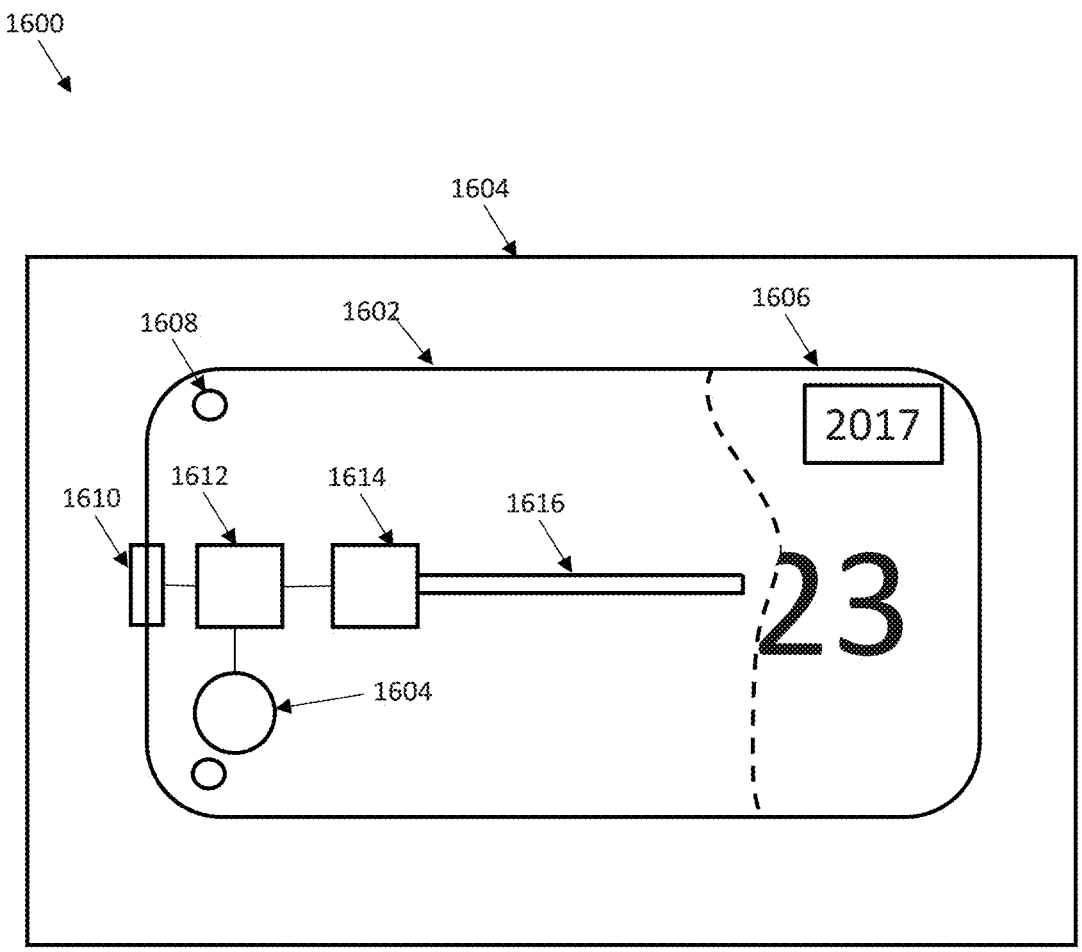
FIG. 16 depicts anti-theft features.

Various structural features on a digital license plate can also provide useful anti-theft protection. For example, as seen in FIG. 16, an antitheft system 1600 for a digital license plate 1602 mounted on a vehicle attached backplate 1604 can include provision of a sensor system 1610 to indicate removal of digital license plate 1602. As seen in FIG. 16, the digital license plate 1602 has a display 1606, illustrated partially removed to indicate various components underneath display 1606. The sensor system 1610 is connected to a controller 1612, which in turn is connected to a wireless system 1614 with GNSS/GPS support and an antenna 1616. While normally powered by connection to a vehicle mounted power system (not shown), the components can be operated for a period of time with a rechargeable secondary battery or a replaceable primary battery (indicated as battery 1604). In some embodiments, one-way "security" screws or other mechanical attachment or interlock elements 1608 with features designed to prevent removal can be used.

Various embodiments of sensor system 1610 are contemplated. For example, first and second locking elements that define an electromechanically actuatable latch can be used. This allows for electronic control and engagement/disengagement of the actuatable latch. Such locking elements are typically positioned adjacent to each other in a locked position, and can include electromagnetically controllable hasps, pins, catches, or latch-bolts. In other embodiments, the sensor system can include locking elements that provide a signal when engaged or disengaged, or both. This can include, for example, a pairable RFID tag and reader, a Hall effect sensor and magnetic material attached or formed as a part of backplate 1604, or an embedded Secure Element chip and chip reader. In some embodiments, operation of lock engagement/disengagement can include use of user defined input credentials (e.g. PIN numbers or passwords), biometric protocols, or other suitable authorization.

In operation of one embodiment, antitheft features can include control of messaging by display 1606. For example, the display 1606 of a digital license plate to display a warning message or set to a blank display when a digital license plate is removed from the without prior authorization from a vehicle. This ensures that stolen plate cannot be used on a different vehicle by different owner and helps ensure illegal acts committed with stolen digital plate will not incorrectly identify a vehicle owner, since the digital license plate does not display the license number once detached from the vehicle. In other embodiments, notification of digital license plate removal from a vehicle is sent to the owner of the plate via email/text message. Notification can include position and vehicle status as determined and transmitted by wireless system 1614 with GNSS/GPS. Further notification and tracking can be provided by suitable software applications on mobile device such as the owner's smartphone, or by cloud connected desktop software.

Once detached from the vehicle, remounting the digital license plate on the vehicle by an existing or new owner requires software authentication. Only after authentication will the correct license number be displayed back on the plate.

In another embodiment, a method for operation of a digital license plate system has as a first step determination if locking elements are disengaged. If locking elements are disengaged, in step an owner or suitable authorities can be wirelessly notified by the digital license plate, using internal battery power of the digital license plate. The license number display can be turned off in step and in step a warning message of theft or unauthorized usage is substituted on the display. If bistable displays are used, the warning message will continue to be displayed even if the battery is removed or exhausted. Displays can be set to provide a warning message if power is supplied. If the digital license plate is returned to the original vehicle, or a transfer of ownership is made, in step normal operation of the digital license plate requires authentication.

In one described embodiment, the digital license plate includes a fully or partially metallic backplate which is permanently or semi-permanently mounted on the vehicle to which digital license plate is later attached. A Hall effect sensor, mechanical switch or a similar component is positioned between backplate and digital license plate to allow detection of digital license plate removal from contact or close association with the metallic back plate. If the sensor detects license plate removal, the digital license plate can use its wireless transmission system to immediately send a theft notification, and continue to send location information for duration of available battery power.

Figure 17:
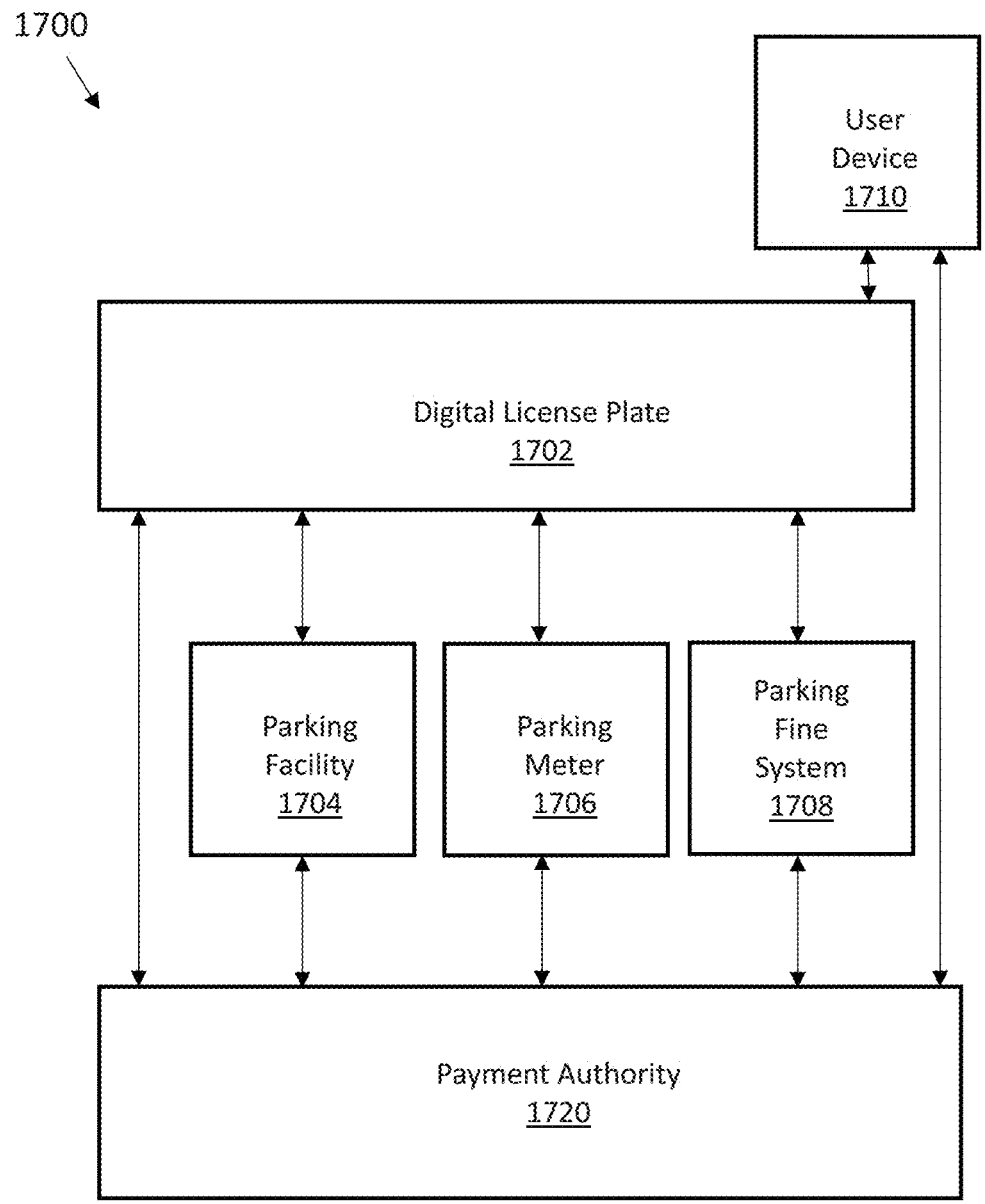
FIG. 17 illustrates a digital license plate parking system.

A digital license plate can be useful for many vehicle related actions. For example, As seen in FIG. 17, a system 1700 for automatically paying parking fees or fines is illustrated. A digital license plate 1702 such as disclosed herein is capable of supporting various communication protocols. The digital license plate can be placed in wired or wireless communication with a user device 1710 configured as a smartphone, portable computer, laptop, integrated eyeglass projection system, tablet, dashboard display, or other portable or vehicle mounted interface system. As illustrated, the digital license plate and/or user device 1710 can operate to interact with a parking facility 1704, parking meter 1706, or parking fine system 1708 to ensure payments are made to a payment authority 1720. In addition, status of parking related information can be presented on a display provided by the digital license plate. In still other embodiments, information related to parking can be electronically provided to a user or authorized third party by the digital license plate, either directly or via the user device 1710. As will be understood, information related to parking can alternatively or in addition be transferred via proprietary servers, cloud based servers or platform, or any suitable messaging system. For example, the digital license plate 1702 and user device 1710 are not required to communicate directly with each other, but instead both communicate with a cloud platform, that in turn communicates with the payment authority 1720. The cloud platform would have the ability to make payments on the behalf of the user, and the user device 1710 and digital license plate 1702 could communicate to confirm location of the parked vehicle and enable that the cloud platform to communicate with the correct authority and make the correct payment. In some embodiments, the cloud platform would also instruct the digital license plate 1702 to display a proper parking notification status.

In certain embodiments, the digital license plate 1702 can operate without human interaction to determine if a vehicle has parked at a parking position, determine the location of the vehicle at that specific parking position, and send a parking notification to at least one of the user device 1710, parking facility 1704, parking meter 1706, parking fine system 1708, remote server or cloud platform, or payment authority 1720 (with such communication indicated by arrows in FIG. 17). Alternatively, a user can manually indicate (via user device 1710) that a vehicle has parked in an area requiring payment. In still other embodiments, the parking facility 1704 or parking meter 1710 can determine presence of the vehicle in a parking spot, and send a payment request or parking information directly or indirectly to the digital license plate 1702.

The user device 1710 typically is provided as a software application or applet. A user can allow manual or automatic payments. Payment notification and/or verification can be received and sent by the user device 1710, or alternatively a receipt can be logged, forwarded, or directly sent as an email, text message, or notice to the user. Payments can be authorized in advance, authorized at the time of parking, authorized using biometric authentication, or the application/applet can be set so that authorization is required if parking is likely to exceed certain monetary amounts. Payment can be made using third party assistance such as provided by credit or debit card issuers, through payment tokens, micropayments, or deductions from pre-paid parking service managers. Payments can be made in a currency of choice, or a currency allowed or required by the payment authority 1720, and can include automatic currency conversion (e.g. bitcoin to dollars, or foreign currency to US dollars).

The payment authority 1720 is typically managed in conjunction with private parking facility owners, city, county, or local traffic control authorities, or private entities having a contractual relationship with city, county, or local traffic control authorities. The payment authority 1720 can be locally or remotely contacted. For example, a parking meter 1706 can include a local Bluetooth beacon and interface that logs payments and immediately or daily sends payment information to a remote server. As another example, a parking facility 1704 can include a server always connected to a cloud based payment service that is capable of acting as a payment authority 1720. Payment can be provided to the payment authority 1720 directly from the digital license plate 1702, from the user device 1710 after receiving payment related information from the digital license plate 1702, via cloud platforms, or from the digital license plate 1702 via the parking facility 1704 or parking meter 1706. In some embodiments (not illustrated), the digital license plate 1702 can provide payment related information to the user device 1710, which in turn directly contacts the parking facility 1704 or parking meter 1706 to transfer payments to the payment authority 1720.

The parking facility 1704 can include, but is not limited to, public or private buildings dedicated to parking, buildings including parking garages, open air parking lots, or street side parking zones or areas. Parking areas can be permanent or temporary parking zones (e.g. for event parking, weekend only, or weekday only). In certain embodiments, access is denied at least in part, by a gate, fence, wall, rope-line, surface or sidewalk markings, or other indicator of a designated parking area. In some embodiments, parking areas can be virtually marked as defined geographic locations that are accessible by wireless beacons or internet facilitated messages.

Typically, the parking facility 1704 is connected to a local, remote, or cloud based payment authority. Payment can be upon passing through a gate or into a marked area. Alternatively, parking within a designated parking space or area can be used to trigger payment. In some embodiment, leaving the parking space or area triggers payment, which can be based on a payment schedule tied to amount of time the vehicle is parked.

Position in a parking facility can be determined with reference to local wireless beacons, inertial navigation systems, LIDAR or time of flight laser systems, camera or video systems, various sensor systems, including accelerometers, light levels, mechanical pressure or triggers, ultrasonic based sensors, or Global Navigation Satellite Systems (GNSS), which can include but are not limited to GPS, GLONASS, Galileo, Beidou or other regional systems. These various systems can be supported in whole or part by the digital license plate 1702, which can provide or receive location information, combine information from vehicle or other sources, or log location information. In some embodiments, a smartphone or other user device 1710 can relay position information from the digital license plate 1702 to improve position accuracy. In still other embodiments, manual input of parking space numbers or smartphone assisted scanning of unique QR codes associated with a parking space can be used to provide accurate parking space information. For example, a phone app on a user device 1710 could scan a QR code displayed near parking spot. This information is relayed to a cloud platform that contacts a relevant parking authority and makes payment. The cloud platform can optionally provide authorization and data to the digital license plate 1702 to initiate display of proper parking status.

Whether a vehicle is parked can be detected by the digital license plate with the aid of the foregoing described sensors. For example, a vehicle can be presumed to have parking if the previously discussed geographic locality or parking position sensors/systems indicate that position has remained unchanged for several minutes. Alternatively, other suitable systems such as vehicle gear position (PARK), engine status, alternator/electrical system status, can be used to determine that the vehicle has parked. In some embodiments, a user can use user device 1710 to manually indicate parking. In still other embodiments, the device 1710, alone or in combination with a suitable cloud platform or remote server with optionally connected parking detection systems, can be used to input or verify parking location.

In some embodiments, parking areas can be defined using geofencing techniques, with areas requiring parking payments being known (via preloaded maps or local broadcast by parking authorities) to any vehicle entering a virtual geofenced defined parking area. The geofence defined area can include parking lots, parking garages, temporary parking areas, select city blocks, streets, or particular sides of streets. Areas within a defined geofence area can still be excluded from legal parking, including reserved spaces, areas near fire hydrants, building entrances and exits, loading zones, bus parking or pickup areas, or areas forbidden for security or safety reasons. The geofence area can change according to time of day, day of the week, or the number of hours a vehicle has previously parked in a defined area.

In certain embodiments, vehicle location information is provided to one or more of the user device 1710, a parking facility server, cloud platform, or data handling system that can be connected to a payment authority. For example, a vehicle parking in a geofenced parking zone could provide (via digital license plate 1702) a parking position to a payment authority 1720, which automatically deducts the required parking payment. In other embodiments, an initial time reserved or minimum parking payment can be made. In still other embodiments, a payment based on actual parking time can be made when the vehicle is turned on or begins to move preparatory to leaving the parking space, parking facility, or parking area.

System 1700 can also support automatic or manually initiated payment of parking fines or penalties. In certain embodiments, payment of other traffic related penalties can also be supported. For example, police, meter readers, or other designated officials can use a portable or handheld device (not shown) to contact the digital license plate, determine if parking fines or penalties are due, and send the digital license information relating to parking ticket, fines, or penalties due. This information can be provided wirelessly, by connection to a wired input/output port, or by visual presentation on the display of the digital license plate. In some embodiments, the user can allow for the parking fines or penalties to be automatically paid, with the police, meter readers, or other designated officials acting as a payment authority 1720.

In some embodiments of system 1700, payments by the digital license plate 1702 can be based on status information sent or relayed from the digital license plate 1702. For example, holders of an unrestricted parking pass (e.g. police, emergency responders, or parking lot managers or employees) can have that information automatically sent to the parking facility or meter to eliminate payment requirements. In other embodiments, information relating to modifying factors such as veteran status, government or private facility employee, faculty/student status, or handicap status can be sent. In addition, or as an alternative, information relating to parking authorization can be displayed on the digital license plate 1702 as visually identifiable "electronic parking stickers" or "electronic tags", instead of, or in addition too, display of conventional window stickers or tags.

In other embodiments of system 1700, the digital license plate 1702 can support a succession of automatic payments to extend allowed parking time. For example, suppose a user has paid for an hour of vehicle parking time at a parking space associated with parking meter 1706. If the user is delayed or unable to return to the parked vehicle, the digital license plate can be set to automatically make another payment for a pre-designated parking time (e.g. 15 minutes, 30 minutes, or an hour). In other embodiments, a user can communicate with the digital license plate as the end of the hour approaches, authorizing payment of additional parking time. In some embodiments, the user device 1710 can support an application or applet that automatically warns the user of upcoming parking fees, and request authorization to send the digital license plate authorization to make payments.

In another supported embodiment of system 1700, the digital license plate can show parking related, vehicle related, or user/owner related information to law enforcement officers, police, meter readers, or other designated officials using a portable or handheld device (not shown) to contact the digital license plate. This information can be provided wirelessly, by connection to a wired input/output port, or by visual presentation on the display of the digital license plate. In one embodiment, textual information, color or symbol tag displays, QR or other bar codes can be displayed.

In one embodiment of system 1700, the digital license plate can be connected a user device that is able to present parking related information to a user before the user actually parks or leaves a parked vehicle. This user information can include information related to parking compliance, including but not limited to presence of fire hydrants, reserved parking for public transportation, pickup locations, driveways, side of street limitations, time limitations, and zone or geographic limitations.

In another embodiment of system 1700, a user device able to directly or indirectly communicate with the digital license plate can receive parking related information. This information could include, but is not limited to, a notification to move a parked vehicle, tow away notification (e.g. triggered by unique accelerometer readings when a car is lifted for towing), or theft notification. In one embodiment, when another authorized user takes the vehicle, a secondary user is identified via the digital license plate and a primary user is notified.

Alternatively, a method for utilizing a digital license plate for payments can involve a determination that a vehicle has parked. This determination can be based on the combination of one or more of accelerometer information, GNSS or GPS location information, or vehicle status information (e.g. PARK notification from vehicle). In a second step, relative (e.g. with respect to beacon) or absolute position of a vehicle (e.g. GNSS) is determined. In a next step, a wireless search is made for information provided by parking related facility, meter, or fine system. Authorization to make a payment is then sent. In a final step, a display of a digital license plate can optionally display parking related information, including a temporary parking tag or other visual indicator of authorized parking. This can include but is not limited to display of textual information, color or symbol tag displays, or QR or other bar codes. In some embodiments, the digital license plate can support a succession of automatic incremental payments to extend allowed parking time.

Figure 18:
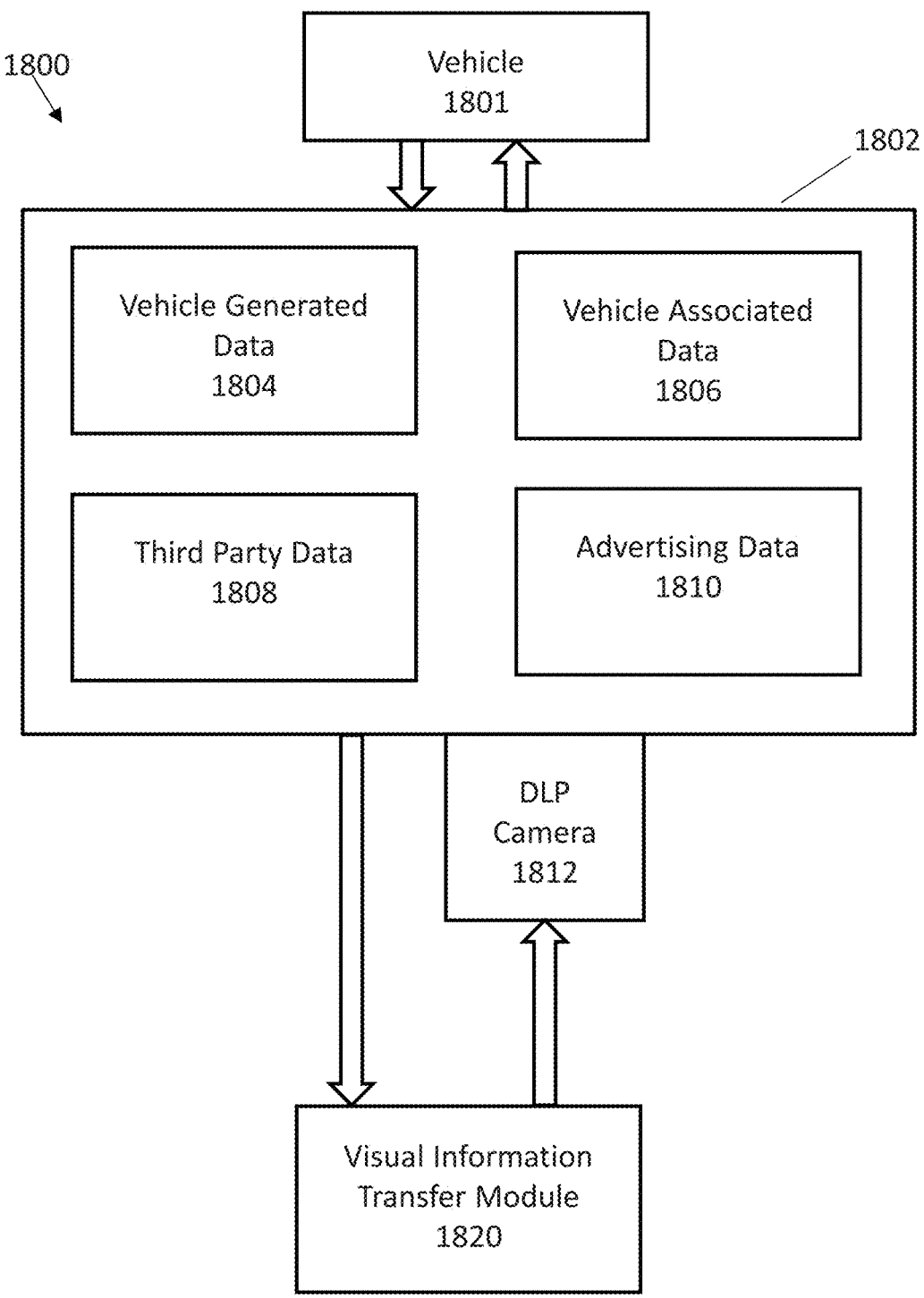
FIG. 18 depicts digital license plate system use of camera data.

The described digital license plate can support a great variety of applications. As seen in FIG. 18, in certain embodiments a visual information transfer system 1800 includes a vehicle 1801 having at least one attachable digital license plate 1802 and optional digital license plate camera 1812 that can present various visual codes suitable for enabling or simplifying data interactions. These interactions can include but are not limited to providing information to a user or other person, providing information from a user to interact with the digital license plate, or provide a mechanism for operating, facilitating transactions, or enabling services that can be related to a vehicle or the digital license plate.

Information represented by these visual codes can be derived from vehicle generated data 1804, vehicle associated data 1806, third party data 1808, or advertising data

1810. For example, vehicle generated data could include mileage information or information for service providers relating to oil level, type, and time since last oil change. Vehicle associated data 1806 could include a vehicle identification number (VIN) or owner address. Third party data 1808 could include symbolic indicators that a parking fee has been paid to a third party, with a visually inspectable parking receipt being provided to the digital license plate by the third party. In other embodiments, a user or third party can provide advertising data 1810 accessible via a visual code.

These visual codes can be, alone or in combination, text, symbols, colors, or electronically readable codes such as barcodes. Text can be rendered in font types that are easily recognized by electronic systems, and patterns or symbols can be high contrast and distinctive. Colors can be selected from a limited palette with widely separated color types to reduce risk of mistaking color in low or poor light conditions (e.g. at night, under sodium vapor lights). Barcodes can be numeric only (e.g. Interleaved 2 of 5, UPC-A, or UPC-E), alphanumeric (e.g. Code 128, Code 39, or US Government LOGMARS code), or 2-Dimensional (e.g. PDF417, Datamatrix, or QR code).

As previously discussed with respect to FIG. 4, since the digital license plate 1802 can render a two-dimensional bar or QR code, an individual outside of the vehicle equipped with a smartphone having a camera can capture or read the bar code. This enables simplified access to data such as a news article, social network, blog, etc. from which the content was sourced. Other applications can include those related to vehicle operation or service, including but not limited to of vehicle start, vehicle stop, vehicle trunk open, vehicle gas cap release, door open, door close, vehicle hood open, and trunk open. For example, a vehicle can be left at a facility for oil change or cleaning service. Scanning the visual codes with a smartphone returns authorization information necessary to open the vehicle hood or car doors for service. This can even include limited authorization to start and move the vehicle within a restricted geographic area. Once service is complete, hoods or doors can be locked, and the vehicle owner remotely notified that the vehicle is ready for pickup.

In those embodiments of the visual information transfer system 1800 supporting a digital license plate 1802 having digital license plate camera 1812, visual information (from visual information transfer module 1820) can be transferred to the digital license plate 1802. For example, a smartphone could initiate a two-way exchange of visual information with the camera equipped digital license plate. The digital license plate can read, for example, a QR code presented by the camera and initiate operations such as door opening. Alternatively, if wireless communication is not available, two-way transfer of substantial amounts of electronic information is still possible using bar codes or other information.

Figure 19:
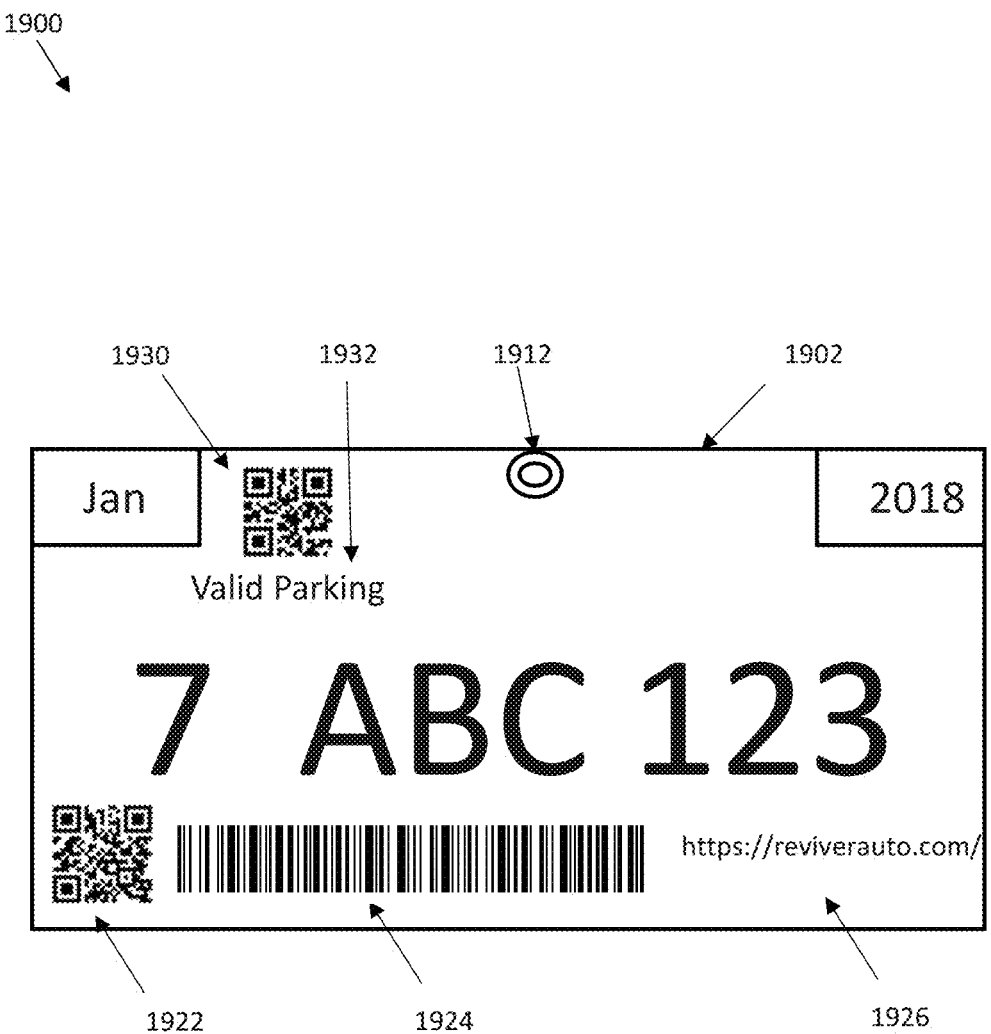
FIG. 19 illustrates a camera equipped digital license plate.

FIG. 19 illustrates one embodiment of a digital license plate system 1900 including a digital license plate 1902 supporting a camera 1912. As seen in FIG. 19, a two-dimensional (QR) bar code 1922 is displayed, along with a standard one-dimensional bar code 1924, and a textual hyperlink 1926 presented in a font easily read by electronic devices such as smartphones. Various types of information can be presented, including hyperlinks (1922, 1924, 1926) or parking permits (QR code 1930 and text 1932. This information is typically displayed only when a car is parked, in response to an electronic request, or when certain conditions such as detected location in a parking facility are true.

In certain embodiments, visual information can be remotely updated. In other embodiments, the information can be presented in response to a request. In still other embodiments, visual information between a camera equipped smartphone and a digital license plate can be interactive. For example, a smartphone can visually present (to a digital license plate equipped with a camera) a QR code requesting certain information. The digital license plate can receive and interpret the request, and if authorized, render a suitable response in text or as a bar code. Since this visual request/provide procedure can be continued, the system can support visual transfer of information without requiring a wireless connection. This can be advantageous, for example, in an environment with large numbers of digital license plates, or localities with extreme electromagnetic interference.

Vehicle rental can be assisted by digital license plate presented information. For example, a user wishing to rent a vehicle without requiring assistance from a rental firm representative, enters a lot containing vehicles having digital license plates displaying vehicle related identifying information. Once the user identifies a suitable vehicle, the user can read the information using a smartphone equipped with a camera. The smartphone remotely communicates with a server or cloud based system to transfer vehicle identification any rental payment authorization. In return, the user receives smartphone authorization from the remote system. This information can be communicated wirelessly to the digital license plate to operate the vehicle. In those embodiments in which the digital license plate is equipped with a camera, operation can be initiated by visual information. Operation can include, for example, opening a door to allow access to a key or electronic key fob, or authorization to allow vehicle start using a smartphone. When a vehicle is returned, the digital license plate can transfer mileage and fuel data to the smartphone for finalizing payment, and the display reinitializes to present information indicating identity and availability for rental.

As previously discussed in this disclosure, digital license plates have the ability to show custom message images when the plate is in a non-driving situation (stationary at lights, parked, etc.). In one embodiment, to enable this messaging feature, the digital license plate can regularly check with an external server to see if messages need to be displayed. If one or more messages are in a display queue, the digital license plate can receive from the server a packet of information that defines the messages and the schedule for the messages to be shown (which can be both time and geo limited). The digital license plate fetches these messages from the server (if they have not been previously stored) and stores them in local storage (typically encrypted). This enables the messaging functionality to work even when the plate is offline.

In some embodiments, the images must be signed by the server or similar digital license plate support system using a secret key. The digital license plate verifies this signature before it allows the messages to be displayed. If an "instant" message functionality is enabled, a SMS message can be sent to the digital license plate by the server, which causes the digital license plate to check with the server immediately. This procedure allows an image or message to be pushed to the digital license plate more quickly than via a standard digital license plate check-in cycle, which could be ordinarily set to check with a server on a time scale of minutes, hours or daily. The messages themselves can be single images uploaded to the server, or they can be a combination of a background image plus overlaid text. This allows for a single template background to be downloaded to the digital license plate, but for different images to be composed out of this by overlaying custom text.

Digital license plates as disclosed can be of utility for rental car companies and customers. For example, a digital license plate attached to a rental car could be directed to display a customer name and message identifying the rental vehicle. For keyless operation, a QR code, various 2-D dimensional bar codes, or other machine interpretable code could also be presented by the digital license plate. This would allow the vehicle renter to scan the machine interpretable code with a phone app that would then unlock the vehicle. QR code functionality could also exist separate from the identify feature. In those embodiments, a rental vehicle customer could walk up and scan with a bar code reader or other suitable smartphone application, automatically paying for and releasing for rental any vehicle in the rental vehicle lot. Similarly, QR or other codes could be used to allow family or friends to access a family vehicle, with notifications of use being provided to the owner or vehicle driver. Such notifications allow an owner to allow use of the vehicle, or send a message denying keyless entry and use. In certain embodiments, information relating to a user renting a vehicle can only be made available if allowed by a user.

Similarly, digital license plates can be used by ride sharing services to simplify identification of a vehicle. Front and/or rear digital license plates can display a name of a rider requesting use of a ride sharing service. Alternatively, or in addition, the name of the ride sharing service can be displayed. In certain embodiments, a ride sharing service can use a digital licensing plate to advertise services and promote use of ride sharing. In other embodiments, the information relating to a user's rideshare is deleted unless a user authorizes sharing that information.

Digital license plates can also support road usage taxes or fees. Instead of using a tax on fuel consumption to repair and maintain transportation infrastructure, a vehicle miles traveled (VMT) fee charges motorists based on their road usage measured in mileage. Typically, these charges can be either a fixed number of cents per mile or a variable fee based on considerations such as time of travel, congestion levels on a roadway, type of road, type and weight of the vehicle, vehicle emission levels, and ability to pay by the vehicle owner. A digital license plate can track mileage, roads used, and time of travel. This information can be used to reduce or augment insurance or road tax/usage fees, depending on the particular roads utilized. Advantageously, vehicles operating out of state (which can be determined via the GPS) would not be subject to state or local road usage taxes. This information can be made available by the user only to a governmental taxing authority.

Location tracking systems can also be used to create geofences with triggered alerts or actions. Geofences are typically designated locations, areas, lines, or borders. In some embodiments, a geofence can be defined to have certain radius around a single point. In other embodiments, a geofence can be any shape creatable from several points. For example, a polygon can be drawn around a geographic location to define a geofence. Alternatively, lines can be drawn, or a pre-existing government boundary such as a city, county, state selected. In certain embodiment, locations or landmarks can be set, with a geofence being automatically created to surround the location or landmark at some arbitrarily close distance. Geofences can be set, for example, around customer sites, an office campus, a vehicle owner's home, or any other suitable location. As another example, a commercial vehicle that carries volatile chemicals could have geofences set around forbidden routes or bridges. Similarly, an oversize, tall, or heavily laden vehicle could set geofences around routes and locations with narrow roads, low underpasses, or weight restricted bridges.

Actions, triggers, flags, or alerts can be taken depending upon various geofence interaction states, including but not limited to action when a vehicle crosses a geofence boundary; action while a vehicle is inside a geofenced area; action while a vehicle is outside a geofenced area; action if a vehicle has been inside or outside a geofenced area for a certain amount of time; or action if a vehicle crosses a geofence boundary more than a certain number of times within a defined time period. Actions can include disabling a vehicle, initiating visual and auditory warnings, or sending messages to supervisors or governmental authorities.

A digital license plate such as discussed herein can support much of the needed user interface, processing, monitoring, and analytic support. For example, geofences can be defined for a vehicle in a database, along with conditions for when a qualifying event has occurred, and the action to be taken. As GPS data streams in from the digital license plate, the location data is checked constantly to see if the vehicle is inside or outside a defined geofence, or has crossed a geofence boundary, and a decision is made as to whether any action is to be triggered. In the case where action needs to be taken on the plate, geofence information can be downloaded to the digital license plate and used for on-plate events, such as displaying specific messages only in certain geographical regions (or maybe not showing any messages at all in some locations). In certain embodiments particularly advantageous for families or multi-vehicle fleets, geofences and associated actions for multiple digital license plates can be set. A digital license plate can transmit geofence and action data to other designated digital license plates, or alternatively, each digital license plate can receive the geofence and action data from a central server.

Other uses for geofences can include but are not limited to

1) Generating a tolling event when a vehicle crosses a defined line (enters onto a bridge for example).

2) Tracking how long vehicles remain inside a specific location, and alert when they leave that area.

3) Geofencing locations to determine if a specific alert message (eg. Amber alert) should be shown or not.

4) Antitheft trigger, when a vehicle moves outside a geofence without authorization.

Location or geofencing services can be used to support other useful functionality of a digital license plate. For example, a road usage system including a digital license plate can create or receive various types of data relevant to road usage and messaging. This data can include vehicle miles travelled data, vehicle associated data third party and government data 908, and GNSS/GPS and mapping data. Based on this information, and if necessary or useful, messages can be adaptively displayed depending on environmental context and conditions. Data can be externally provided to the digital license plate using a server or cloud based external authorization and tracking service. The link to the service can be secured and encrypted using PKI or similar standards, and only reliable data or other information is transmitted to the digital license plate. In addition, vehicle miles travelled data, GNSS/GPS and mapping data, and other vehicle associated data can be transmitted to the service for long term storage and use, for example, in calculating road usage fees, taxes, or insurance related costs.

In one embodiment, GNSS/GPS and mapping data can be used for identifying roads subject to rationing. Road rationing has been implemented to reduce traffic or pollution, and typically involves association of license plate number characteristics (e.g. odd or even), registration dates, or similar, with days of the week that a vehicle is allowed to be on a specified road. In one embodiment, the digital license plate can present additional messaging that displays the right to be on a road. In other embodiments, event or emergency conditions can be used for road rationing purposes. Federal, state, or local databases can be used to provide supporting data, and the digital license plate can track and identify required conformance with regulations.

In other embodiments, specific information related to authorized road usage can be displayed. For example, fire roads, power line access roads, roads in or near military facilities or airports can be restricted to authorized users and vehicles. The digital license plate can display suitable authorizations, and in embodiments equipped with biometric verifications, establish authorization for the driver and passengers.

Communication with the described digital license plate for the purpose of supporting the various above described applications can benefit from use of multiple antenna systems. An antenna system facilitating wireless communication for a digital license plate can be mounted on a vehicle body. The digital license plate can have an upper portion, a lower portion, and sides and which include multiple antennas that are internally mounted, surface attached, or positioned near the digital license plate. Antennas can include vertically mounted antennas, bottom mounted strip or flex antennas, antennas horizontally mounted on a lower portion of the digital license plate. Other antennas can include a side edge mounted vertical antenna, a centrally located planar antenna, and an antenna perpendicularly extending outward with respect to the digital license plate.

Advantageously, antennas can be positioned wholly or partially in the lower portion of the digital license plate. This positioning effectively reduces electromagnetic screening (including signal blocking, signal frequency spreading, or metal proximity caused detuning) by overhanging body components of a vehicle body when the digital license plate is attached to typically recessed license plate holder of a vehicle. Advantageously, a centrally mounted antenna permits mounting of the digital license plate at any arbitrarily selected rotationally oriented position with reduced impact on antenna effectiveness. Similarly, vertically extending antennas and reduce impact on antenna effectiveness when the digital license plate is installed upside down. For an antenna extending perpendicular to the digital license plate 602, mounting on the upper portion is possible, while still benefiting from reduced electromagnetic screening by overhanging body components.

Antenna type used can vary according to application, frequency range, required gain, cost, and other parameters. Antennas can support GNSS, GPS, LTE, GSM, WLAN, MAN, CDMA, wireless routers, mobile smartphones or handsets, Bluetooth, and or other protocols and devices. As previously noted in this disclosure, antennas can support full Bluetooth transmit and receive capability, alternative short-range communication systems and protocols, or longer distance Wi-Fi or other communication systems that can support payment interactions. Payment can be made by the digital license plate alone or in combination with driver or passenger smartphone systems, vehicle electronic systems, or other communication hardware.

Multiple antenna types, supported protocols, and operational modes can be used, including single-input, single-output (SISO) antenna systems using only one antenna. While inexpensive, SISO systems are often sensitive to location and can greatly benefit from positioning on the lower portion of the digital license plate. Higher performance antenna systems can include a SISO with antenna diversity. For example, in one configuration, the antenna system has two antennas. While a SISO system with a single antenna can only receive a signal with respect to one point in space, a SISO system with antenna diversity support can have two or more antennas, any one of which can be used at any point in time. This allows the antenna system to switch antennas if the performance of one antenna is insufficient. In certain embodiments, the antenna system can use antenna control logic to switch to the best antenna to overcome any low signal or multipath associated problems. Typically, antennas should be positioned at least a quarter of a wavelength apart from each other. This quarter of a wavelength spacing is about is three centimeters in the widely used 2.4 GHz band and 1.5 centimeters in the 5 GHz band.

The described antenna system can also support multiple-input, multiple-output (MIMO) systems that use multiple antennas to concurrently receive and transmit wireless data. For example, a 2×2 MIMO system is a two-data stream system using two spaced apart antennas. MIMO antenna systems require adequate isolation between each antenna, and benefit from moving antennas as far away from each other as possible. Alternatively, or in addition, antenna polarization can be adjusted. For example, antennas can be arranged at 90-degree angle with respect to each other, one in in the horizontal polarization and the other in the vertical polarization. In still other embodiments, directional antenna systems such as Yagi or horn antennas can be used to isolate the antennas.

In yet another embodiment, multi-communication antenna systems can be used. Multi-communication antenna systems use two different protocols standards, such as Wi-Fi and Bluetooth, and typically require multiple antennas. For example, Wi-Fi and Bluetooth operate at the same frequencies, so separation and adequate isolation between the antennas is needed to allow Wi-Fi and Bluetooth to operate concurrently.

Antennas can include planar antennas such as microstrip and printed antennas, metal-plate antennas, ceramic chip and dielectric resonator antennas. These antennas have extensive applications in mobile systems (such as 900/1800 MHz bands), wireless local area networks (WLANs, such as 2.4/5.2/5.8 GHz bands), and ultra-wideband (UWB, such as 3.1~10.6 GHz band) communications. Other antennas can include, microstrip patch antenna (MPA), planar inverted-F Antenna (PIFA), printed antennas (e.g. monopoles, slot meander line etc.), flexible printed antennas, and 3d printed antennas.

Antennas can be selected and positioned to take into account board or other ground effects. For example, a monopole antenna typically uses a large ground which is considered part of the antenna. Inverted-F (PIFA) antennas are less sensitive to ground, while dipole or sleeve antennas can establish their establishing their own ground reference. Surrounding materials or components, particularly if conductive, can also effect antenna reliability and performance. In certain embodiments, ground plane or surrounding material effect can be reduced by positioning one or more antennas away from the digital license plate. Multiple antennas can be distributed around a vehicle. These antennas can ensure adequate reception and transmission of data.

Antennas can be detachable or replaceable. Low performance and inexpensive antennas can be replaced with higher performance antennas as after-purchase add-ons. In other embodiments, mechanically damaged, corroded, or otherwise poorly performing or broken antenna systems can be replaced.

Use of multiple antennas allow for prioritization of antenna use by the digital license plate, local beacons or connections (e.g. such as a parking facility with wireless payment system), or cloud connected cellular 3G, 4G, or 5G services. For example, antennas mounted on a top or side of vehicle can be given transmission or reception priority to maximize signal strength, depending on reception feedback signal intensity information that is remotely provided. This can include transfer of pairing with data on location and type of antenna or other data to best match reliability of connection being initially provided. In certain embodiments, pairing can be dynamic, with signal strength updates being used to switch between the best positioned antennas or protocols.

In other embodiments, an antenna system can support RF signal transfer using an antenna feeder or transmission line. This can include, but is not limited to coaxial wired transfer of an RF signal from one or more antennas remotely mounted from the digital license plate. In other embodiments, separated antennas can be connected to wireless nodes able to act as forwarder or signal repeater for pickup by the digital license plate. In some embodiments, these nodes can also provide data processing or reduction before forwarding a wireless digital signal. Such embodiments support, for example, wireless transmission of sensor data from a remotely located node on the vehicle to the digital license plate. Alternatively, or in addition, one digital license plate can effectively use a signal received or transmitted from a second digital license plate. This can be useful for transferring data between front and rear digital license plates, or between rear and trailer mounted digital license plates.

In one embodiment, an antenna system can include antennas suitable for RF energy harvest from either/both dedicated or ambient RF. Dedicated RF can include directionally radiated RF energy positioned in a vehicle garage, while ambient RF can include a wide variety of available RF signals broadcast into the environment. Harvested energy can be directly used (e.g. to support circuitry needed to switch a display presentation) or stored in capacitors or battery systems for future use. Suitable antennas can use either a single frequency or multiple frequency bands, and RF energy harvest can occur from a single or multiple sources simultaneously. The energy harvesting system typically includes an impedance matching resonator circuit operating at the designed RF energy harvest frequency to maximize the power transfer from the antenna(s).

In the foregoing description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The foregoing detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. A digital license plate having a display and supporting multiple power states, comprising:
    a temperature sensor;
    a power path control module to initiate power state changes and adjust power depending on a system state as determined by the temperature sensor; and
    wherein the display that as critical temperatures are approached acts to display only legally required information or information that would not interfere with viewing of legally required information.

2. The digital license plate of claim 1, wherein state changes include an off state, a sleep state, a wake state, and a semi-wake state.

3. The digital license plate of claim 1, wherein state changes are triggered in response to detected vehicle voltage.

4. The digital license plate of claim 1, wherein state changes are triggered in response to vehicle motion.

5. The digital license plate of claim 1, wherein state changes are triggered in response to wireless connection status.

6. The digital license plate of claim 1, wherein state changes are triggered in response to location or location changes.

7. The digital license plate of claim 1, wherein the display is a bistable display.

8. The digital license plate of claim 1, further comprising a temperature control module connected to the temperature sensor and configured to modify heat relevant display parameters as critical temperatures are approached;
    wherein the heat relevant display parameters include a displayed pattern to modify reflectivity, with the displayed pattern being modified to increase heat absorption as critical low temperatures are approached and modified to decrease heat absorption as critical high temperatures are approached.

9. The digital license plate of claim 1, further comprising an interface to a vehicle systems module to receive vehicle identification information, including a vehicle identification number; and
    a communication module to transmit vehicle identification number and digital license plate identifer to a central server, the central server able to act in the event of a security mismatch to modify operation of the digital license plate.

10. The digital license plate of claim 1, further comprising a first locking element attached to the digital license plate;
    a second locking element attachable to a vehicle and engageable with the first locking element; and
    wherein disengagement of the first and second locking elements triggers at least one of a wireless theft communication signal and an internal theft status indicator.

11. The digital license plate of claim 1, wherein the digital license plate is connectable to send and receive data; wherein the data is sendable to at least one of a parking related facility, meter, and fine system, and further wherein data is sendable to a payment authority.

12. The digital license plate of claim 1, further comprising an external user interface to the digital license plate, configured to allow a user to provide user authorization to control release of sensor and other data from the digital license plate.

13. The digital license plate of claim 1, wherein the digital license plate supports a payment system that receives road usage information from digital license plate and wirelessly connects to a payment authority to pay fees based on the road usage information, and wherein the display indicates current payment status.

14. The digital license plate of claim 1, wherein the digital license plate has an upper portion and a lower portion, and at least one antenna of an antenna system attached to the digital license plate is positioned at the lower portion to reduce electromagnetic screening when the digital license plate is attached to a vehicle.

15. The digital license plate of claim 1, wherein the digital license plate has a display able to present electronically readable visual information; and wherein the electronically readable visual information is usable to facilitate provision of services.

16. The digital license plate of claim 1, wherein the digital license plate has a display able to present electronically readable visual information comprising two-dimensional barcodes.

17. A method of operating a digital license plate having a bistable display and a temperature sensor, comprising:
    measuring temperature of at least one of ambient temperature or the bistable display;
    modifying heat relevant display parameters as critical low temperatures are approached; and
    displaying only legally required information or information that would not interfere with viewing of legally required information as the critical low temperatures are approached.

* * * * *